US012576792B2

(12) United States Patent
    Frederickson

(10) Patent No.: US 12,576,792 B2
(45) Date of Patent: Mar. 17, 2026

(54) CLAMP MECHANISM

(71) Applicant: Rivian IP Holdings, LLC, Plymouth, MI (US)

(72) Inventor: Austin Lee Frederickson, Carlsbad, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 446 days.

(21) Appl. No.: 18/194,157

(22) Filed: Mar. 31, 2023

(65) Prior Publication Data

US 2024/0174183 A1    May 30, 2024

Related U.S. Application Data

(60) Provisional application No. 63/385,452, filed on Nov. 30, 2022.

(51) Int. Cl.
    B60R 11/00          (2006.01)
(52) U.S. Cl.
    CPC ....... B60R 11/00 (2013.01); *B60R 2011/0003* (2013.01); *B60R 2011/0071* (2013.01)
(58) Field of Classification Search
    CPC ............. B60R 11/00; B60R 2011/0003; B60R 2011/0071
    USPC ...................................................... 292/256
    See application file for complete search history.

(56) References Cited

U.S. PATENT DOCUMENTS

| | | | | | |
|---|---|---|---|---|---|
| 111,725 | A | | 2/1871 | Cady | |
| 2,134,823 | A | * | 11/1938 | Herrmann et al. ....... | B60R 9/02 |
| | | | | | 269/254 R |
| 2,961,262 | A | * | 11/1960 | Nockels ............. | B62D 33/0273 |
| | | | | | 296/57.1 |
| 4,134,345 | A | | 1/1979 | Baldwin et al. | |
| 4,488,707 | A | * | 12/1984 | Mosley ................... | F16G 15/00 |
| | | | | | 403/100 |
| 4,583,896 | A | * | 4/1986 | Vogg ...................... | B64D 9/003 |
| | | | | | 410/92 |
| 6,073,979 | A | * | 6/2000 | Nawalaniec ............. | B07B 1/46 |
| | | | | | 292/DIG. 60 |
| 6,343,815 | B1 | * | 2/2002 | Poe ........................ | E05C 19/145 |
| | | | | | 292/DIG. 31 |
| 6,511,271 | B1 | * | 1/2003 | Saroka .................. | B60P 7/0823 |
| | | | | | 410/35 |
| 6,789,832 | B2 | * | 9/2004 | Gort ........................ | B60R 11/00 |
| | | | | | 248/323 |

(Continued)

FOREIGN PATENT DOCUMENTS

| | | |
|---|---|---|
| DE | 29 33 970 A1 | 3/1981 |
| DE | 39 38 208 C1 | 11/1990 |

(Continued)

OTHER PUBLICATIONS

Non-Final Office Action on U.S. Appl. No. 18/194,134 dated Oct. 24, 2025.

(Continued)

*Primary Examiner* — Nathan Cumar
(74) *Attorney, Agent, or Firm* — Foley & Lardner LLP

(57)                    ABSTRACT

An apparatus can include a clamp member to apply a force to an object. The apparatus can include a release member to release the force from the object. The apparatus can include a force member to increase the force applied to the object via the clamp member.

18 Claims, 25 Drawing Sheets

(56) References Cited

U.S. PATENT DOCUMENTS

| | | | | |
|---|---|---|---|---|
| 7,802,827 B2 * | 9/2010 | Easterday | ............ | B65D 45/345 |
| | | | | 292/319 |
| 7,823,957 B2 * | 11/2010 | Williamson | ............. | B60J 7/104 |
| | | | | 292/DIG. 49 |
| 8,960,764 B2 * | 2/2015 | Spencer | ................... | B60J 7/104 |
| | | | | 296/100.07 |
| 9,004,548 B2 * | 4/2015 | Joret | ..................... | E05C 19/145 |
| | | | | 292/96 |
| 9,022,439 B2 * | 5/2015 | Ousley | .................... | H02G 9/10 |
| | | | | 292/346 |
| 9,810,000 B2 * | 11/2017 | Schroeder | ............... | E05B 65/06 |
| 9,810,285 B2 * | 11/2017 | McNeilly | ................ | F16G 15/00 |
| 10,836,326 B1 * | 11/2020 | Yang | .................... | H04B 1/3877 |
| 2019/0184907 A1 * | 6/2019 | Weintraub | ............. | B60R 11/00 |
| 2020/0148130 A1 * | 5/2020 | Palaka | .................. | H02J 7/0042 |
| 2021/0009023 A1 | 1/2021 | Hoeper et al. | | |

FOREIGN PATENT DOCUMENTS

| | | | |
|---|---|---|---|
| DE | 10 2010 048 176 B3 | 1/2012 |
| GB | 0 491 723 A | 9/1938 |
| JP | 5822730 A | 2/1983 |
| JP | S6138835 Y2 | 11/1986 |
| KR | 101912906 B1 | 10/2018 |

OTHER PUBLICATIONS

German Office Action on DE Appl. No. DE102023133453.0 dated Jan. 29, 2026, with machine translation.

* cited by examiner

2500

CLAMP MECHANISM

CROSS-REFERENCE TO RELATED APPLICATION

This application claims priority to and the benefit of U.S. Provisional Patent Application No. 63/385,452, titled "LATCH MECHANISM" and filed on Nov. 30, 2022, the entire contents of which are hereby incorporated by reference in its entirety.

INTRODUCTION

Objects can be secured in place via a securing mechanism. Containers can be opened via an access point.

SUMMARY

At least one aspect is directed to an apparatus. The apparatus can include a clamp member to apply a force to an object. The apparatus can include a release member to release the force from the object. The apparatus can include a force member to increase the force applied to the object via the clamp member.

At least one aspect is directed to a method. The method can include coupling a clamp member with a post. The post can translate to move the clamp member between a first position and a second position. The method can include providing a release member to control a position of the post. The release member can facilitate movement of the clamp member from the second position to the first position. The method can include disposing a force member between the clamp member and the release member. The force member can increase the force applied to the object with the clamp member in the second position.

At least one aspect is directed to a bed box of a vehicle. The bed box can include a clamp mechanism. The clamp mechanism can include a clamp member to move between a first position and a second position. The clamp member can apply a force to an object in the second position. The clamp mechanism can include a release member disposed away from the clamp member. The release member can return the clamp member from the second position to the first position. The clamp mechanism can include a force member disposed between the clamp member and the release member. The force member can increase the force applied to the object via the clamp member.

At least one aspect is directed to an apparatus. The apparatus can include a clamp member that moves between a first position and a second position. The second clamp position can apply a force to an object. The apparatus can include a force member. Actuation of the force member can increase the force applied to the object via the clamp member. The apparatus can include a release member. Actuation of the release member can return the clamp member from the second position to the first position.

At least one aspect is directed to an apparatus. The apparatus can include a frame defining a cavity. The frame can comprise a top edge and a bottom edge. The apparatus can include a lid coupled with the frame via the top edge. The lid can rotate around the top edge to open and close the apparatus. The apparatus can include a base coupled with frame via the bottom edge. The base can rotate around the bottom edge to open and close the apparatus.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
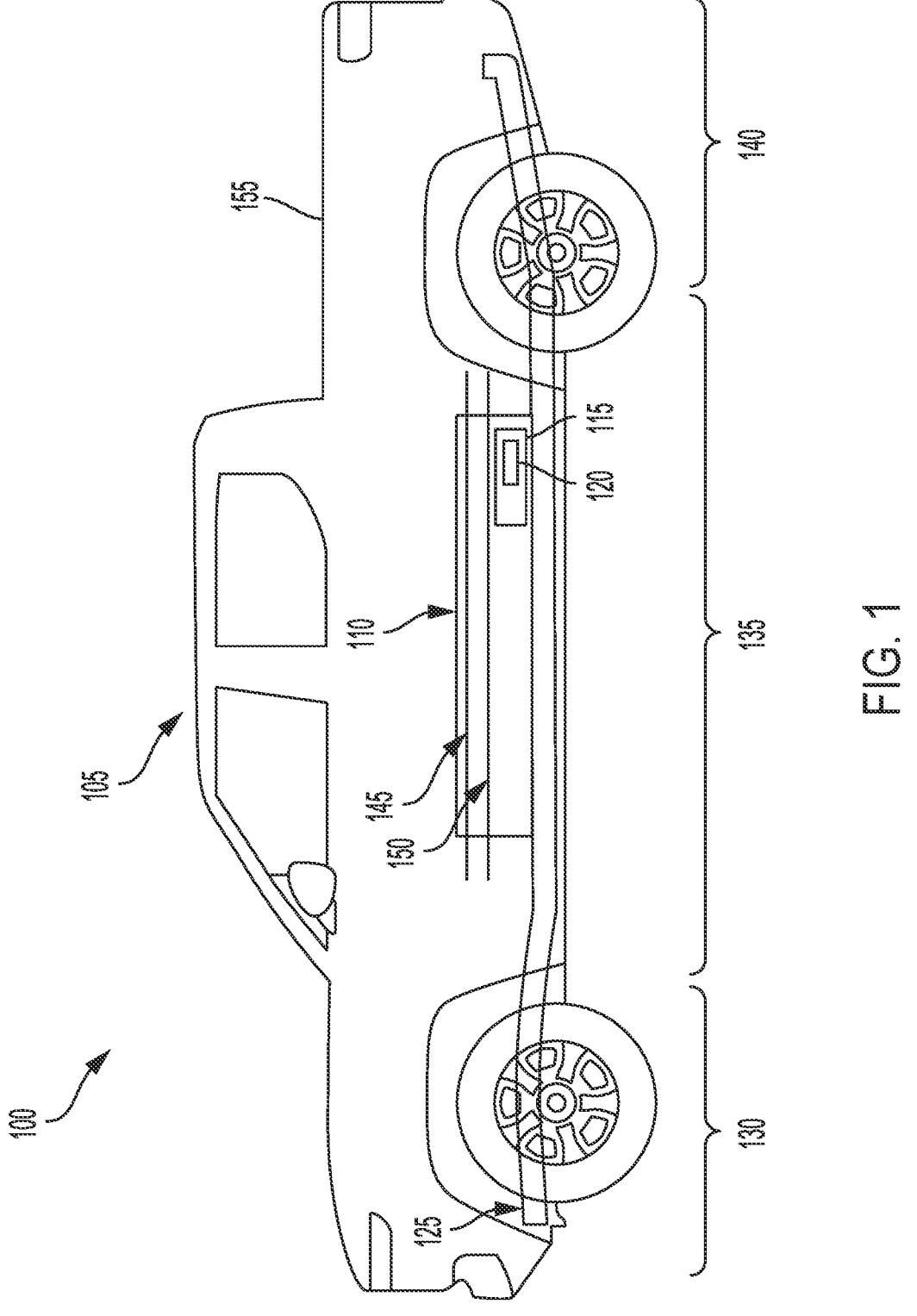
FIG. 1 depicts a cross-sectional view of an electric vehicle, in accordance with some aspects.

Following below are more detailed descriptions of various concepts related to, and implementations of, methods, apparatuses, and systems of latching a component or object in a desired position, clamping a component or object in place, and opening a container. The various concepts introduced above and discussed in greater detail below may be implemented in any of numerous ways.

The present disclosure is directed to systems and methods of latching a component in a desired position. For example, the present disclosure is directed to a latch mechanism for latching or securing a component to a vehicle. This disclosed solution has a technical advantage of using an over-centering orientation of the latch mechanism to latch a component to a vehicle using few or no tools. The over-centering orientation can use external forces applied to the mechanism that typically cause latches to release to instead facilitate further securing of the component. The latch mechanism can include a hook. The hook can contact a positioning feature of a component to secure the component in place. The latch mechanism can include a lever. A force applied to the lever can cause the hook to move from a first (e.g., open) position to a second (e.g., closed) position. The latch mechanism can include a link. The link can extend between the lever and the hook, coupling the lever with the hook, such that movement of the lever can cause movement of the hook. With the latch mechanism in a closed position, a lever point and a hook point can be disposed above a center of rotation of the lever, which can create the over-centering orientation. Due to the over-centering orientation, the latch mechanism can tighten the grip of the hook on the positioning feature to increase the secureness of the component when the mechanism experiences external forces (e.g., vibrations, bumps, etc.).

The disclosed solutions have a technical advantage of using few or no tools to secure a component in a desired location. A force applied by a human hand, for example, can move the latch mechanism between the open, unlatched position and the closed, latched position. A spring within the latch mechanism can also reduce the force that is need to be applied. The disclosed solutions also have a technical advantage of using external forces to further secure the latch mechanism rather than unlatch the latch mechanism. For example, a force applied to the hook that, if the hook were used on its own, would cause the hook to move in a direction that would release or unlatch the component, can instead create a force on the lever that further pushes the lever toward the latched position and prevents the hook from unlatching the component.

The present disclosure is also directed to systems and methods of clamping a component or object in place. This disclosed solution has a technical advantage of tightly securing an object in place underneath a bed box of a truck such that a longer object may extend beyond an end of the bed of the truck, but still remain secured in the bed of the truck. This aspect can include a bed box. The bed box can include a clamp member. The clamp member can move between a first position (e.g., stored position) to a second position (e.g., extended position). The clamp member can extend below the bed box and contact a surface of an object to be secured in the second position. The bed box can include a force member. The force member can move between a first position and a second position to increase a pressure or force that the clamp member applies to the object. The bed box can include a release member. Actuation of the release member can cause the clamp member to return to the first position.

The present disclosure is also directed to systems and methods of opening a container or box. This disclosed solution has a technical advantage of opening the box via a first access point and a second access point. This aspect can include a box. The box can have a frame, a lid coupled with the frame, and a base coupled with the frame. The box can open via both the lid and the base. For example, the lid can be coupled with a back edge of the top of the frame such that the lid can rotate around the back edge and open via the top front of the box. The base can be coupled with a front edge of the bottom of the frame such that the base can rotate around the front edge and open via the back bottom of the box.

FIG. 1 depicts is an example cross-sectional view 100 of an electric vehicle 105 installed with at least one battery pack 110. Electric vehicle 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Yet, it should also be noted that battery pack 110 may also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

The electric vehicle 105 can include a truck bed 155. The truck bed 155 can be exposed to the environment. For example, the truck bed 155 can have no cover. The truck bed 155 can be at least a part of the rear portion 140 of the electric vehicle 105. The truck bed 155 can be at least a part of the body portion 135 of the electric vehicle 105.

Figure 2:
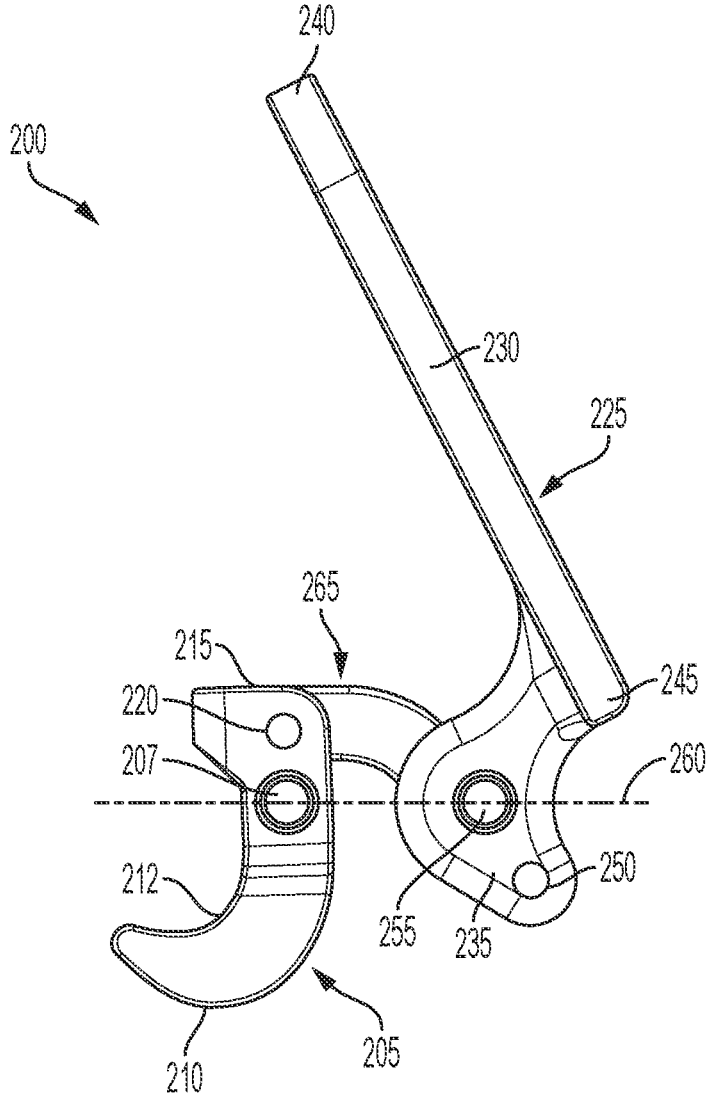
FIG. 2 depicts a side view of an example apparatus, in accordance with some aspects.

FIG. 2 depicts a side view of an apparatus, shown as latch mechanism 200. The latch mechanism 200 can be or can include a latching or mounting mechanism. The latch mechanism 200 can include at least one hook 205, at least one lever 225, and at least one link 265. The hook 205 can move between a first hook position (e.g., open, unsecured, or unlatched position) and a second hook position (e.g., closed, secured, or latched position). The hook 205 can have a hook rotation point 207. For example, the hook 205 can rotate about the hook rotation point 207 as the hook 205 moves between the first hook position and the second hook position. The hook 205 can include a first hook end 210 and a second hook end 215. The first hook end 210 can extend at least partially around an external component. For example, the first hook end 210 can have a curved shape to extend around at least a portion of the external component. The shape of the first hook end 210 can define at least one pocket 212. The pocket 212 can receive the external component. The second hook end 215 can couple with at least one other component of the latch mechanism 200. The hook 205 can include at least one hook point 220. The hook point 220 can be disposed proximate to the second hook end 215. The hook 205 can couple with the other component of the latch mechanism 200 at the hook point 220.

The lever 225 can include at least one handle 230 and at least one base 235. The handle 230 can be an elongated member. The handle 230 can have a first handle end 240 and a second handle end 245. The base 235 can extend from the second handle end 245. The handle 230 can receive an external force. For example, a force can be applied proximate to the first handle end 240. The base 235 can couple with at least one other component of the latch mechanism 200. For example, the lever 225 can include at least one lever point 250. The lever 225 can couple with the other component at the lever point 250. The lever point 250 can be disposed on the base 235.

The lever 225 can move between a first lever position and a second lever position. The lever 225 can have a lever rotation point 255. The lever 225 can rotate about the lever rotation point 255 as the lever moves between the first lever position and the second lever position. The first lever position can include the handle 230 disposed at an upwardly angled orientation (e.g., vertical). The second lever position can include the handle 230 disposed at a horizontal orientation. Movement of the lever 225 can cause movement of the hook 205. For example, as the lever 225 moves between the first lever position and the second lever position, the hook 205 can move between the first hook position and the second hook position.

The lever rotation point 255 can align with the hook rotation point 207. For example, a first axis, shown as rotation point axis 260, can extend between and through the hook rotation point 207 and the lever rotation point 255. As the lever 225 and the hook 205 move between positions, the hook rotation point 207 and the lever rotation point 255 can remain stationary. For example, the rotation point axis 260 that extends through the hook rotation point 207 and the lever rotation point 255 can remain at substantially the same orientation as the lever 225 and the hook 205 move between positions. As shown in FIG. 2, among others, the rotation point axis 260 can be at a first orientation when the lever 225 is in a first lever position and the hook 205 is at a first hook position. The rotation point axis 260 can remain in substantially the same orientation when the lever 225 moves to a second lever position and the hook 205 moves to a second hook position.

Figure 3:
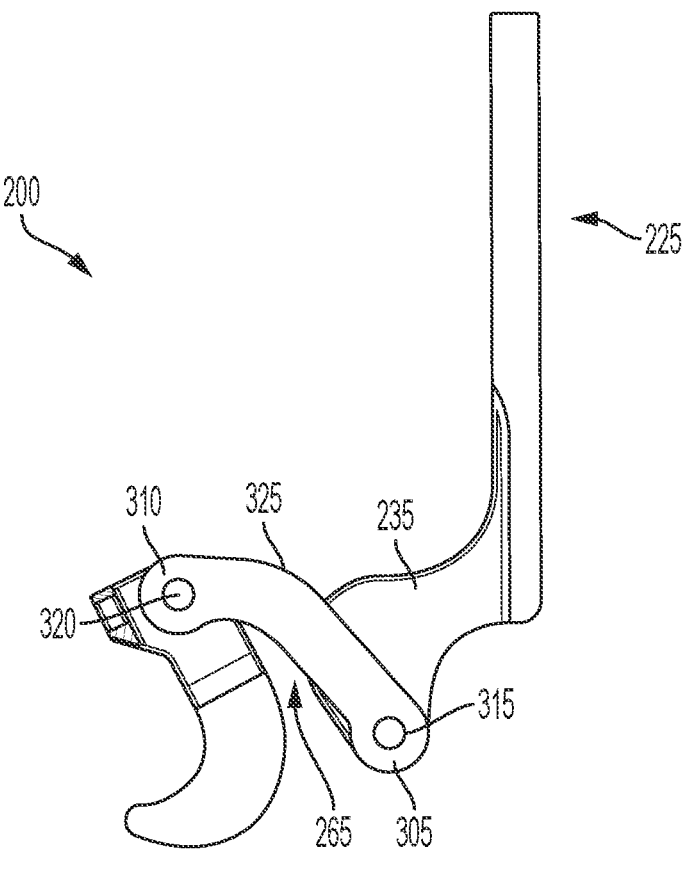
FIG. 3 depicts a cross-sectional side view of an example apparatus, in accordance with some aspects.

FIG. 3 depicts a cross-sectional view of the latch mechanism 200. The link 265 can be an elongated member. The link 265 can couple the lever 225 with the hook 205. For example, the link 265 can extend between the hook point 220 and the lever point 250. The link 265 can have a first link end 305 and a second link end 310. The link 265 can have a first connection point 315 disposed proximate to the first link end 305 and a second connection point 320 disposed proximate to the second link end 310. The first link end 305 can couple with the base 235 of the lever 225 at the lever point via the first connection point 315. The second link end 310 can couple with the hook 205 at the hook point 220 via the second connection point 320. The link 265 can include a bend 325 disposed between the first link end 305 and the second link end 310. For example, the bend 325 can create an angle in the link 265 of approximately 135 degrees. The bend 325 can be disposed closer to the second link end 310 than the first link end 305. The link 265 can facilitate the lever 225 moving the hook 205 between the first hook position and the second hook position.

The link 265 can couple with the lever 225 via a slot and a pin. For example, the lever 225 can have a pin or a protrusion. The pin can be the lever point 250. The first connection point 315 of the link 265 can be a slot (e.g., an elongated aperture). The slot can receive the pin. As the lever 255 rotates, the pin can slide through the slot to move the link 265 and therefore move the hook 205.

Figure 4:
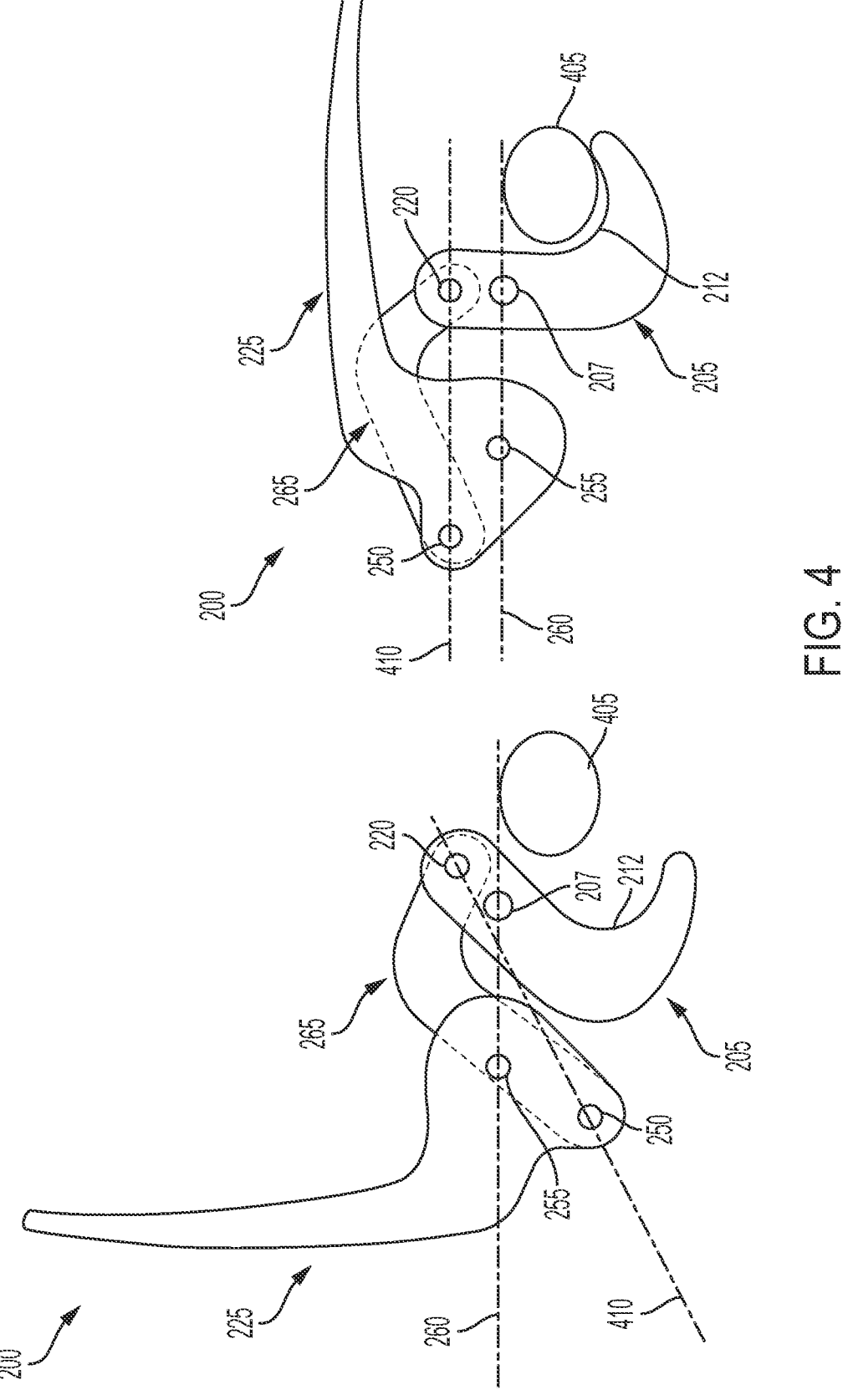
FIG. 4 depicts side views of an example apparatus, in accordance with some aspects.

FIG. 4 depicts side views of the latch mechanism 200. The latch mechanism 200 can move between a first position and a second position. The first position can be an open or unlatched position. The second position can be a closed or latched position. To move the latch mechanism 200 between the first and second positions, the lever 225 can receive a force to cause the lever to rotate about the lever rotation point 255. Rotation about the lever rotation point 255 can cause the lever 225 to move from a more vertical position to a more horizontal position (with reference to FIG. 4). Motion of the lever 225 can cause the link 265 to move due to the connection between the base 235 of the lever 225 and the first link end 305 of the link 265. The motion of the link 265 can cause the hook 205 to move due to the connection between the hook 205 and the second link end 310 of the link 265. The link 265 can couple at various locations of the lever 225 and the hook 205 such that movement of the lever 225 can cause a pushing force or a pulling force. The shape of the base 235 of the lever 225 and the shape of the link 265 can cause the second hook end 215 to rotate toward the lever 225 as the hook 205 move from the first position to the second position. The first hook end 210 can rotate away from the lever 225 such that the pocket 212 of the hook 205 can receive at least one external component 405. For example, the external component 405 can be any component coupled or integral with an object that can be configured to facilitate securing the object in place. For example, the external component may be a rod that extends from a side of a truck bed box that is configured to secure the bed box within a truck bed 155 of the electric vehicle 105.

The latch mechanism 200 can have a second axis, shown as connection point axis 410, that can extend between and through the hook point 220 and the lever point 250. The orientation with respect to the connection point axis 410 and the lever rotation point 255 can change as the latch mechanism 200 moves between the first and second positions. For example, with the hook 205 and the lever 225 in a first position, the lever point 250 can be disposed below the lever rotation point 255 such that the lever rotation point 255 can be disposed on a first side of the connection point axis 410 (e.g., above the connection point axis 410). With the latch mechanism 200 in the second position, the lever point 250 can be disposed above the lever rotation point 255 such that the lever rotation point 255 can be disposed on a second side of the connection point axis 410 (e.g., below the connection point axis 410). Having the lever rotation point move from the first side of the connection point axis 410 to the second side of the connection point axis 410 can create an over-centering effect. The over-centering effect can cause forces on the hook 205 that traditionally would unlatch the hook 205 to instead force the lever 225 to move more toward the closed or latched position, further securing the external component in the pocket 212 of the hook 205. For example, a force on the hook 205 aimed toward the lever 225 can attempt to rotate the hook 205 clockwise (e.g., with respect to FIG. 4) around the hook rotation point 207. However, the arrangement of the latch mechanism 200 can prevent the hook 205 from rotating clockwise when the lever 225 is in the closed position. For example, rotation of the hook 205 in a first direction when the hook 205 is in a first (e.g., open) position can cause rotation of the lever 225 in a second direction (e.g., opposite the first direction). Rotation of the hook 205 in the first direction when the hook 205 is in a second (e.g., closed) position can cause rotation of the lever in the first direction. For example, rotation of the hook 205 in a clockwise direction can attempt to move the second hook end 215 clockwise. However, a clockwise rotation of the second hook end 215 can cause the link 265 to move to the right, which can cause the lever point 250 to rotate clockwise around the lever rotation point 255 and further force the lever 225 toward the second or closed position. When the hook 205 is in the first position, a clockwise rotation of the second hook end 215 can cause the link 265 to move to the right and can cause the lever point 250 to rotate counterclockwise around the lever rotation point 255. Having the lever rotation point 255 on the first side of the connection point axis can allow the hook 205 to rotate clockwise and release the external component 405 and having the lever rotation point 255 on the second side of the connection point axis 410 can prevent the hook 205 from rotating clockwise and releasing the external component 405.

Figure 5:
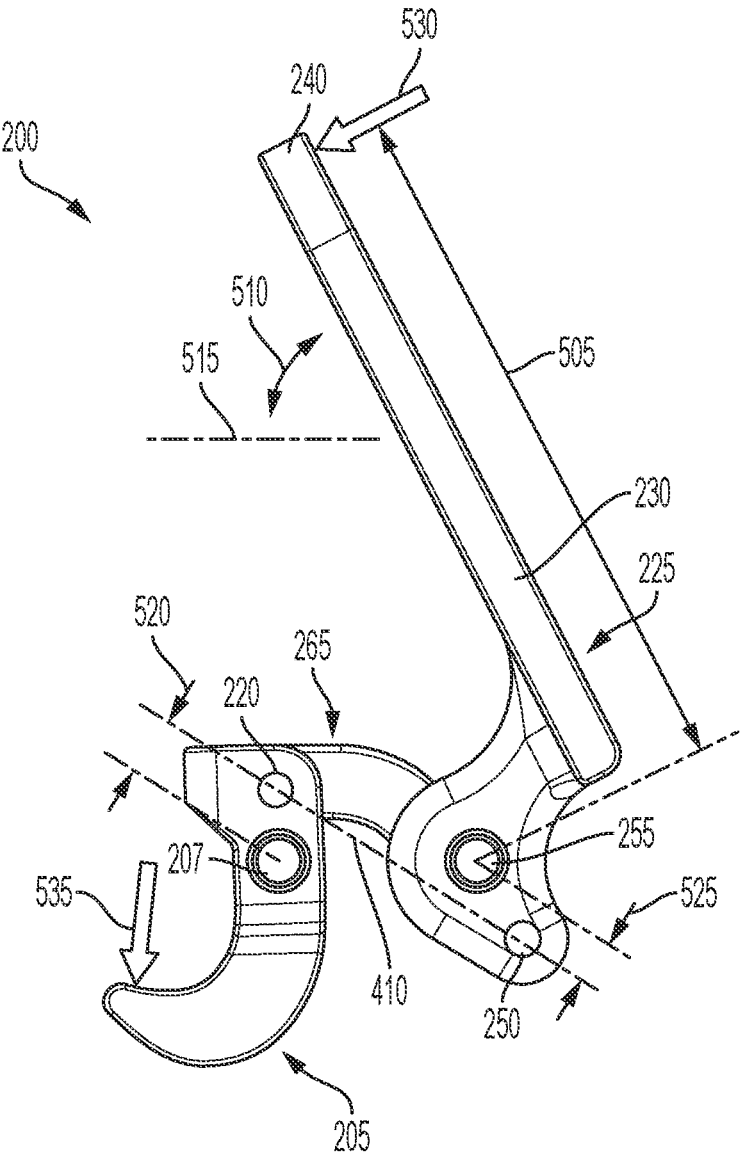
FIG. 5 depicts a side view of an example apparatus, in accordance with some aspects.

FIG. 5 depicts a side view of the latch mechanism 200. The lever 225 can have a handle length 505. The handle length 505 can be measured between the first handle end 240 and a center of the lever rotation point 255. The handle length 505 can be, for example, approximately 80 mm (+/−10%). The handle 230 can be oriented at an angle 510. The angle 510 can be measured relative to a horizontal axis 515. The angle 510 can change as the lever 225, and therefore the handle 230, moves between the first lever position and the second lever position. A first distance, shown as hook distance 520, can define a distance between a center of the hook rotation point 207 and the connection point axis 410. A second distance, shown as lever distance 525, can define a distance between the center of the lever rotation point 255 and the connection point axis 410. The hook distance 520 and the lever distance 525 can change as the hook 205 and the lever 225 move. For example, as the angle 510 gets smaller, the hook distance 520 can increase and the lever distance 525 can decrease. The orientation of the latch mechanism 200 can provide a mechanical advantage to actuate the latch mechanism 200. For example, an input force 530 can be applied to the handle 230 (e.g., at the first handle end 240). The latch mechanism 200 can provide a clamping load 535. The clamping load 535 can be based, at least partially on the input force 530. The clamping load 535 can be based, at least partially on the lever distance 525. For example, as the lever distance decreases, the clamping load 535 can increase. This clamping load 535 can facilitate the latching of the latch mechanism 200 with a smaller input force 530. For example, the latch mechanism 200 can provide a clamping load of over 260 lbs (e.g., approximately 264 lbs) (+/−10%) with an input force of approximately 10 lbs (+/−10%). As the lever distance decreases, the clamping load 535 for a given input force 530 can increase.

Figure 6:
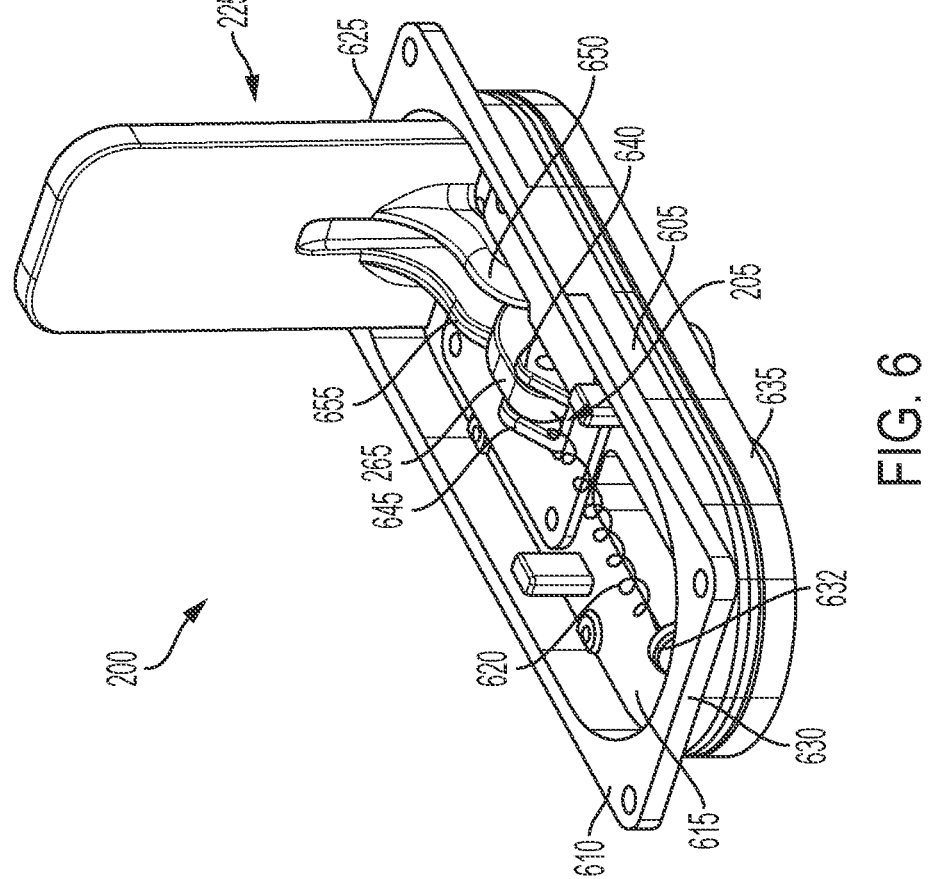
FIG. 6 depicts a perspective view of an example apparatus, in accordance with some aspects.

FIG. 6 depicts a perspective view of the latch mechanism 200. The latch mechanism 200 can include a housing 605. The housing 605 can be coupled to or integral with a surface or can be disposed in a recess. The housing 605 can have a top surface 610. The housing 605 can define at least one cavity 615. The hook 205, the lever 225, and the link 265 can be disposed, at least partially, in the cavity 615 of the housing 605. For example, when the latch mechanism 200 is in the second position (e.g., closed or locked), the hook, 205, the lever 225, and the link 265 can be disposed in the cavity 615 with the lever 225 substantially flush with the top surface 610 of the housing 605. For example, the lever 225 and the top surface 610 can make a flat surface. The lever 225 can align with the top surface 610 of the housing 605.

The hook 205 can have a first hook side 640 and a second hook side 645. The first hook side 640 can mirror the second hook side 645. At least a portion of the first hook side 640 can be spaced apart from the second hook side 645. For example, the second link end 310 can be disposed between the first hook side 640 and the second hook side 645. A second hook end 215 of the first hook side 640 can couple with a first side of the second link end 310 and a second hook end 215 of the second hook side 645 can couple with a second side of the second link end 310.

The base 235 of the lever 225 can have a first base side 650 and a second base side 655. The first base side 650 can mirror the second base side 655. At least a portion of the first base side 650 can be spaced apart from the second base side 655. For example, the first link end 305 can be disposed between the first base side 650 and the second base side 655. The first base side 650 can couple with a first side of the first link end 305 and a second hook end 215 of the second base side 655 can couple with a second side of the first link end 305.

The latch mechanism 200 can include at least one bias spring 620. The bias spring 620 can be coupled with the housing 605. For example, the housing 605 can have a first housing end 625 and a second housing end 630. The first housing end 625 can be opposite the second housing end 630. The lever 225 can be disposed proximate the first housing end 625. The bias spring 620 can couple with the second housing end 630. For example, the first housing end 625 can have a projection 632. The projection 632 can extend from the second housing end 630 into the cavity 615 toward the first housing end 625 or can be disposed proximate to the second housing end 630. The bias spring 620 can couple with the projection 632. The bias spring 620 can extend from the first housing end 625 to at least one of the hook 205 and the link 265. The bias spring 620 can couple with at least one of the hook 205 and the link 265. The bias spring 620 can bias the latch mechanism 200 to the second (e.g., closed or latched) position. For example, the bias spring 620 can apply a force on the hook 205 to help move the lever 225 and the hook 205 to the respective second positions. The bias spring 620 can reduce the external force needed to move the lever 225 from the first lever position to the second lever position.

The latch mechanism 200 can include at least one compliant member. The compliant member can add compliance to the latch mechanism 200 and provide the necessary flexibility such that the latch mechanism 200 can latch onto various external components without being over constrained. The compliant member can facilitate the latching of various external components without needing to tune the latch mechanism 200 specifically for each external component. The compliant member can be any type of compliant component. For example, the compliant member can be a compressible member, a spring (e.g., a tension spring), or a bendable member, among others. The compliant member can be disposed at any location of the latch mechanism 200. For example, the compliant member can be a flexible link 265. For example, the link 265 can be made of a material that provides enough flexibility to accommodate the latching of objects of various sizes, shapes, and configurations. The link 265 can have various mechanical features (e.g., relief notches) to accommodate the various objects. The compliant member can be a gasket 635. The gasket 635 can be disposed around at least a portion of the housing 605. For example, the gasket 635 can be disposed around a bottom perimeter of the housing 605.

Figure 24:
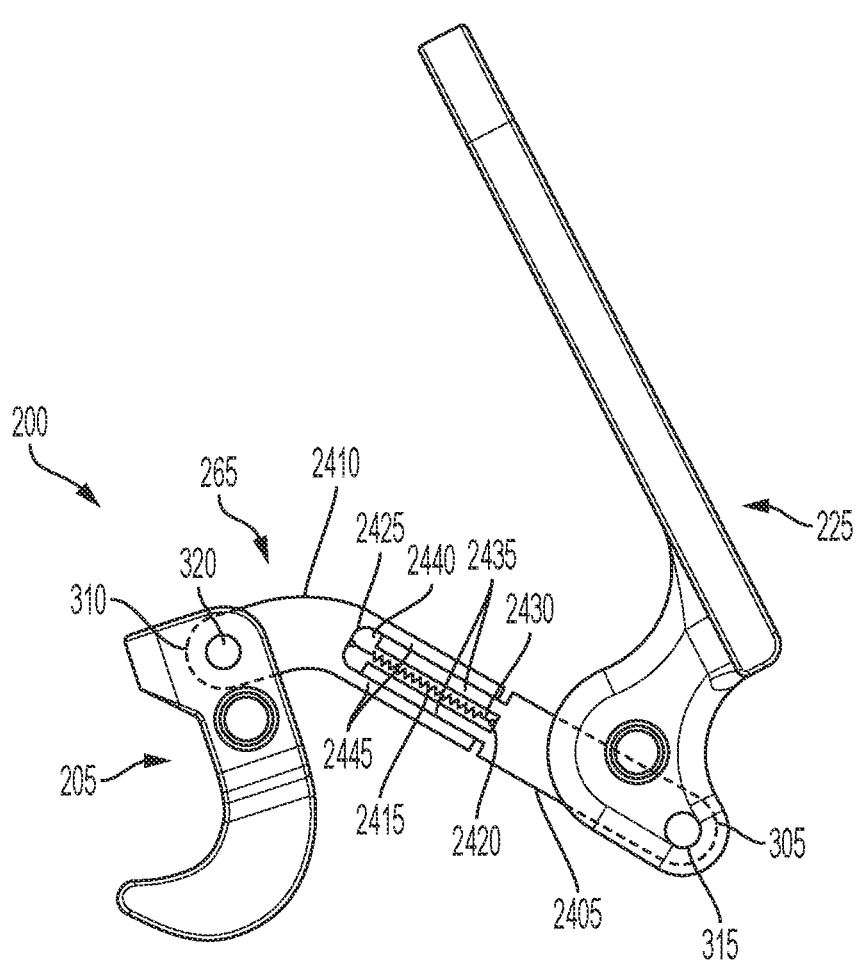
FIG. 24 depicts a side view of an example apparatus, in accordance with some aspects.

FIG. 24 depicts a side view of the latch mechanism 200. The compliant member can be a part of the link 265. For example, the link 265 of the latch mechanism 200 can include a plurality of components. For example, the link 265 can include at least one lever portion 2405. The lever portion 2405 can include the first link end 305. The lever portion 2405 can be coupled with the lever 225 via the first connection point 315. The link 265 can include at least one hook portion 2410. The hook portion 2410 can include the second link end 310. The hook portion 1410 can be coupled with the hook 205 via the second connection point 320. The link 265 can include at least one compliant member. For example, the compliant member can be a spring 2415. The spring 2415 can be disposed between the lever portion 2405 and the hook portion 2410. The spring 2415 can couple with a lever portion surface 2420 and a hook portion surface 2425.

The lever portion surface 2420 can be disposed in a first pocket 2430. For example, the lever portion 2405 can include a plurality of first projections 2435. The plurality of first projections 2435 can define the first pocket 2430. The hook portion surface 2425 can be disposed in a second pocket 2440. For example, the hook portion 2410 can include a plurality of second projections 2445. The plurality of second projections 2445 can define the second pocket 2440. The first projections 2435 can be disposed at least partially in the second pocket 2440 (e.g., between the second projections 2445). The spring 2415 can be disposed at least partially in the first pocket 2430 and the second pocket 2440. The latch mechanism 200 can include both the gasket 635 and the spring 2415, or just one of the gasket 635 or the spring 1415.

Figure 7:
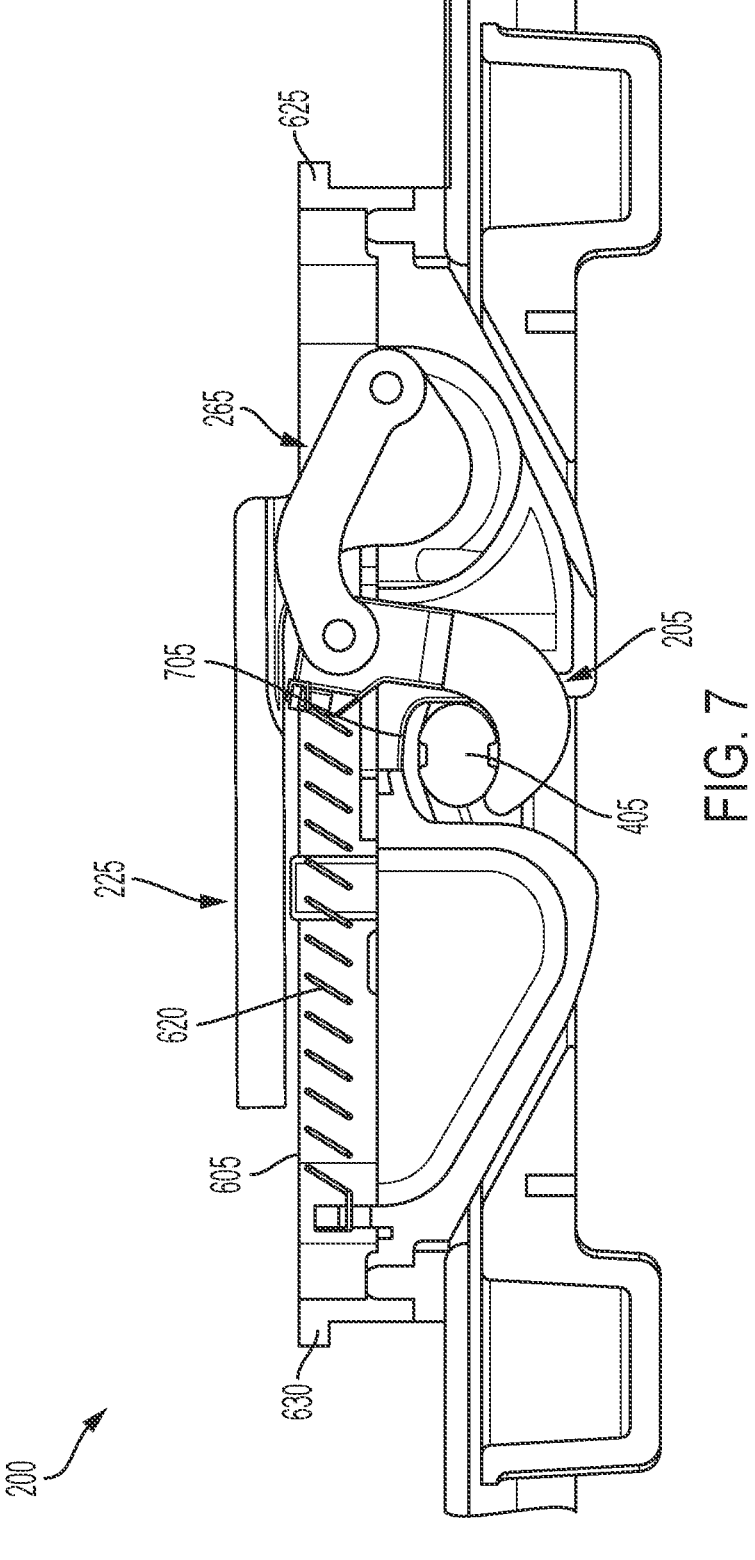
FIG. 7 depicts a cross-sectional side view of an example apparatus, in accordance with some aspects.

FIG. 7 depicts a side cross-sectional view of the latch mechanism 200. The housing 605 can define at least one recess 705. The recess 705 can receive the external component 405 that is to be secured by the latch mechanism 200. The hook 205 can move in and out of the recess 705 to latch and unlatch the external component 405. The recess 705 can be disposed proximate to a center of the housing 605.

Figure 8:
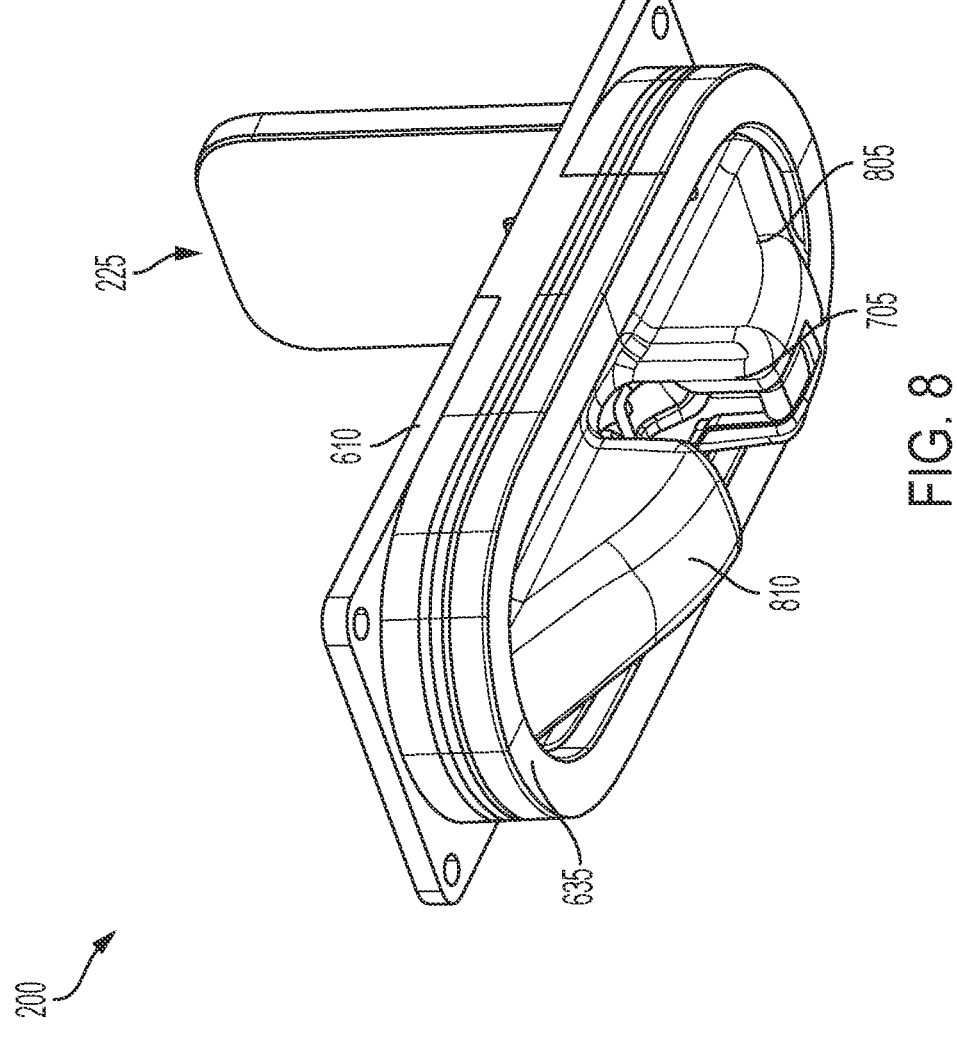
FIG. 8 depicts a bottom perspective view of an example apparatus, in accordance with some aspects.

FIG. 8 is a bottom perspective view of the latch mechanism 200. The recess 705 can be defined by a first housing protrusion 805 and a second housing protrusion 810. The protrusions 805, 810 can extend from a bottom of the housing 605 and extend beyond the gasket 635. The protrusions 805, 810 can have a sloped surface. For example, the protrusions 805, 810 can begin close to the bottom of the housing 605 proximate the housing ends 625, 630 and extend away from the bottom of the housing 605 as the protrusions 805, 810 extend toward the center of the housing 605.

Figure 9:
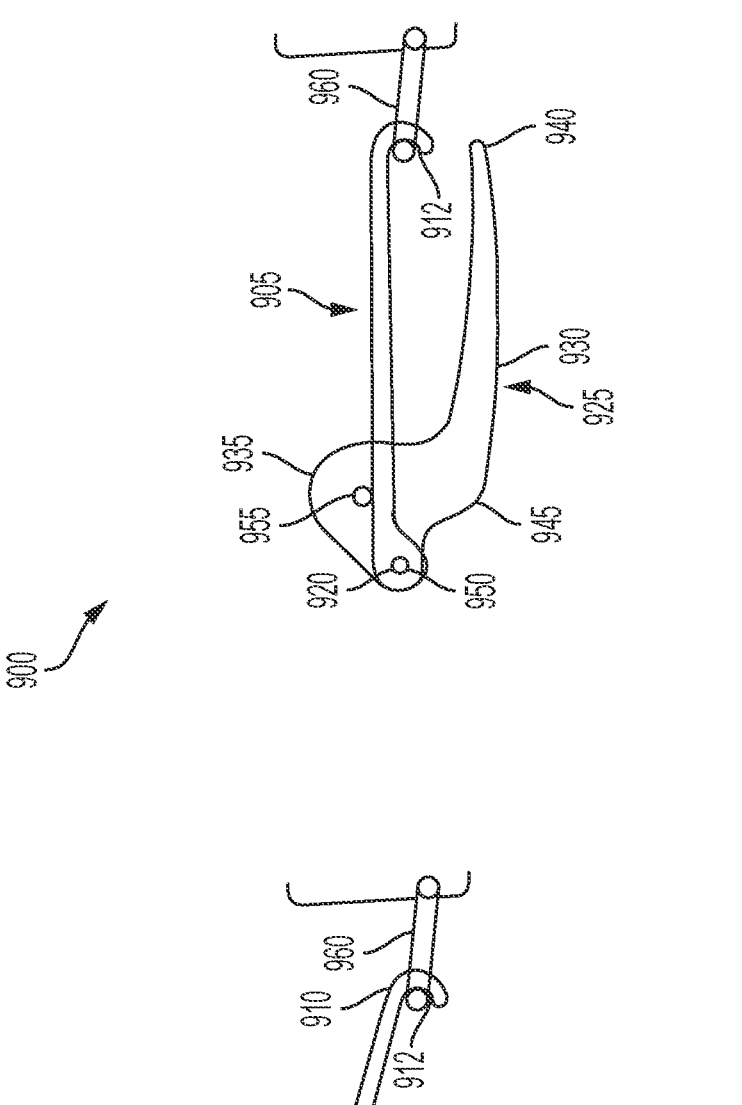
FIG. 9 depicts side views of an example apparatus, in accordance with some aspects.

FIG. 9 is a side view of an apparatus, shown as latch mechanism 900. The latch mechanism 900 can include at least one hook 905 and at least one lever 925. The hook 905 can include a first hook end 910 and a second hook end 915. The first hook end 910 can extend at least partially around at least one external component 960. For example, the first hook end 910 can have a curved shape to extend around at least a portion of the external component 960. The shape of the first hook end 910 can define at least one pocket 912. The pocket 912 can receive the external component 960. The second hook end 915 can couple with at least one other component of the latch mechanism 900. For example, the second hook end 915 can couple with the lever 925. The hook 905 can include at least one hook point 920. The hook point 920 can be disposed proximate to the second hook end 915. The hook 905 can couple with the lever 925 at the hook point 920.

The lever 925 can include at least one handle 930 and at least one base 935. The handle 930 can be an elongated member. The handle 930 can have a first handle end 940 and a second handle end 945. The base 935 can extend from the second handle end 945. The handle 930 can receive an external force. For example, a force can be applied proximate to the first handle end 940. The base 935 can couple with at least one other component of the latch mechanism 900. For example, the lever 925 can include at least one lever point 950. The lever 925 can couple with the other component at the lever point 950. The lever point 950 can be disposed on the base 935. For example, the lever 925 can couple with the hook 905 at the lever point 950.

The lever 925 can move between a first lever position and a second lever position. The lever 925 can have a lever rotation point 955. The lever 925 can rotate about the lever rotation point 955 as the lever moves between the first lever position and the second lever position. The first lever position can include the handle 930 disposed at a vertical orientation. The second lever position can include the handle 930 disposed at a horizontal orientation. Movement of the lever 925 can cause movement of the hook 905. For example, as the lever 925 moves between the first lever position and the second lever position, the hook 905 can move between the first hook position and the second hook position.

In the first position, the hook point 920 can be disposed above the lever rotation point 955. In the second position, the hook point 920 can be disposed below the lever rotation point 955. Having the hook point 920 disposed below the lever rotation point 955 can create an over-centering effect. Due to the over-centering effect, forces on the hook 905 that traditionally would unlatch the hook 905 can instead force the lever 925 to move more toward the closed or latched position, further securing the external component 960 in the pocket 912 of the hook 905. For example, a force on the hook 905 can attempt to rotate the hook 205 counter-clockwise (e.g., with respect to FIG. 9) and release the external component 960. However, the arrangement of the latch mechanism 900 can prevent the hook 905 from rotating counter-clockwise when the lever 925 is in the closed position. For example, rotation of the hook 905 in a counter-clockwise direction can attempt to move the second hook end 915 counter-clockwise clockwise. However, a counter-clockwise clockwise rotation of the second hook end 915 can cause the lever point 950 to rotate counter-clockwise around the lever rotation point 955 and further force the lever 925 toward the second or closed position. Having both the hook point 920 below and the lever point 950 disposed below the lever rotation point 955 can prevent the hook 205 from rotating counter-clockwise and releasing the external component 960.

Figure 10:
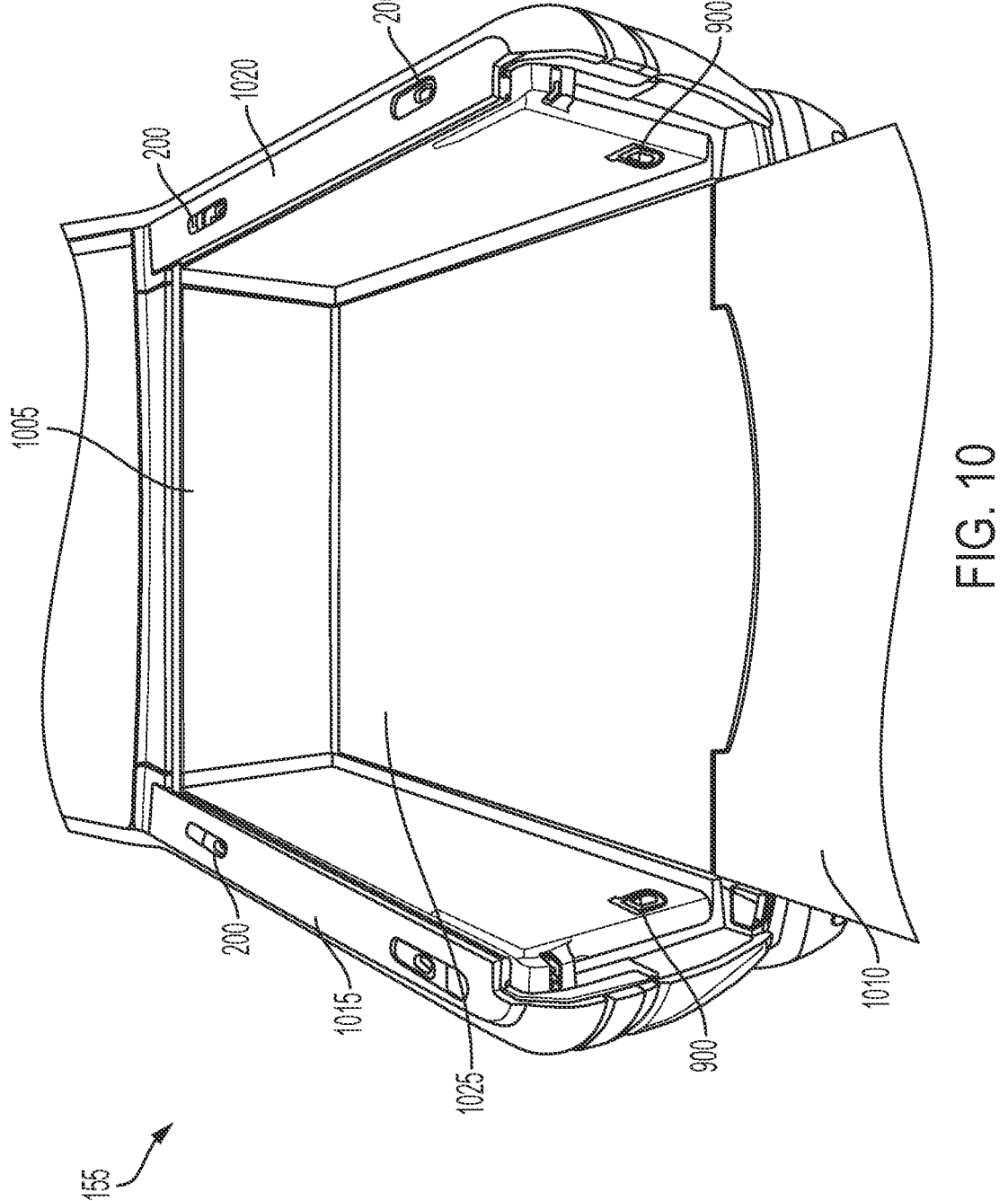
FIG. 10 depicts a top perspective view of a truck bed, in accordance with some aspects.
Figure 11:
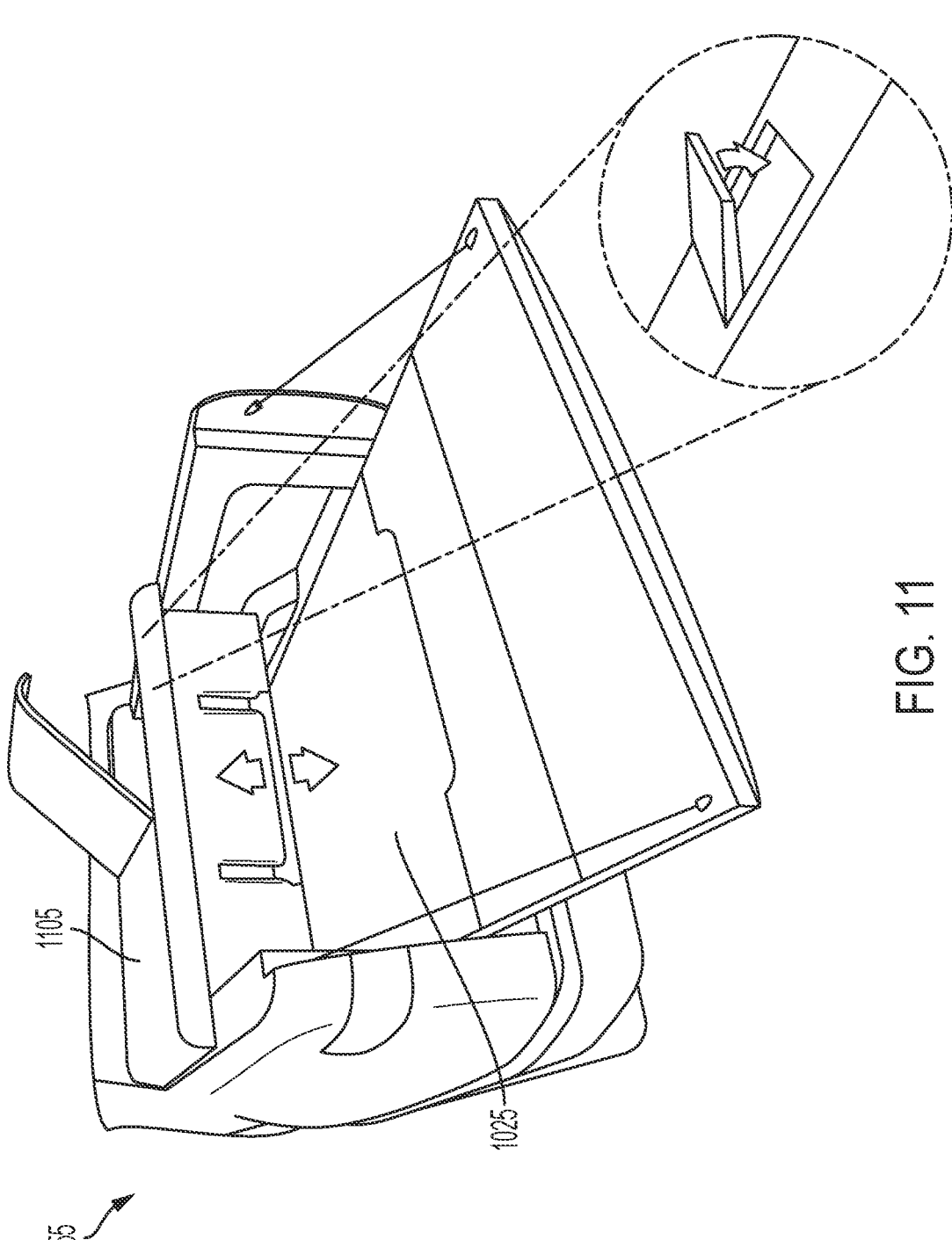
FIG. 11 depicts a perspective view of an example container, in accordance with some aspects.
Figure 12:
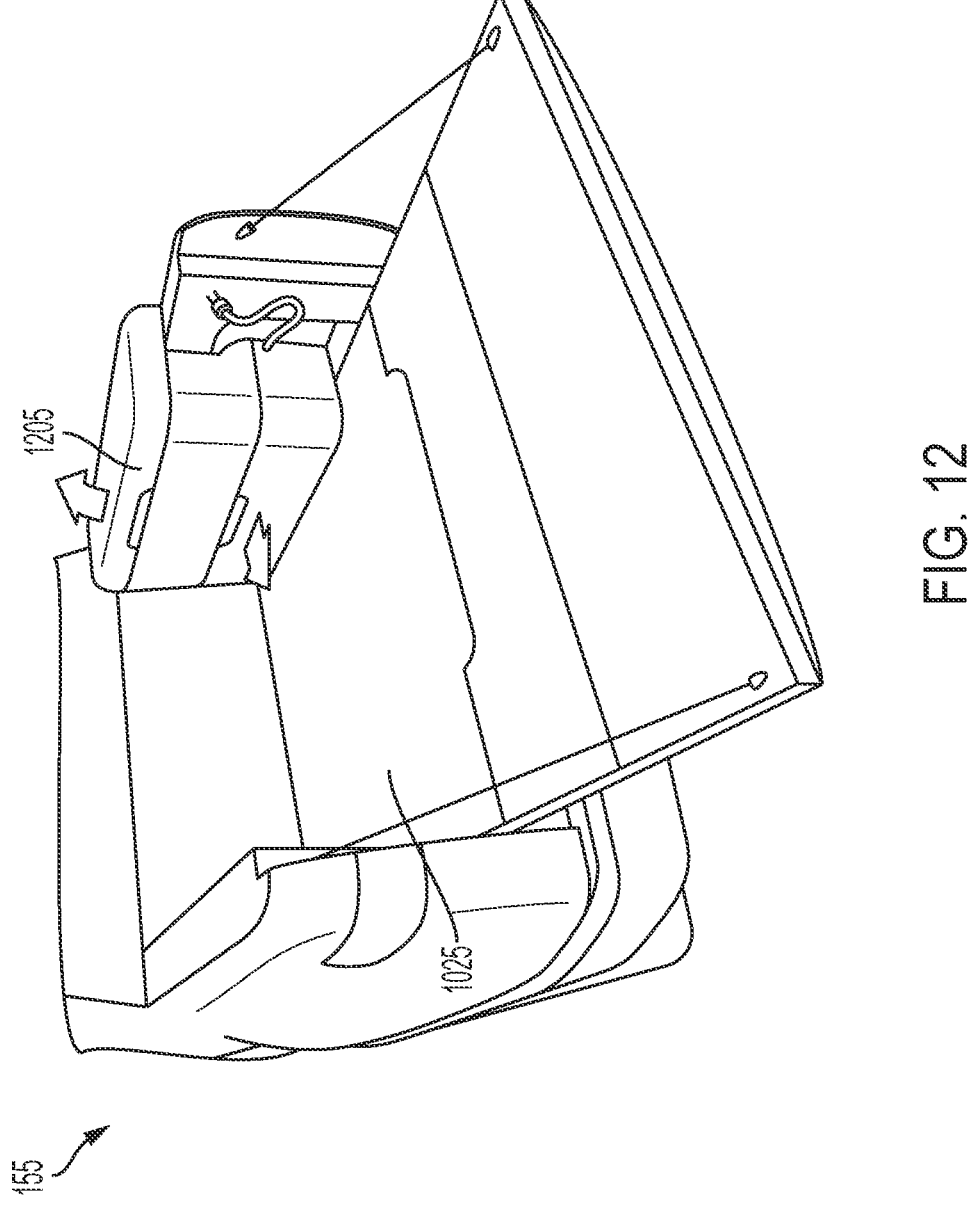
FIG. 12 depicts a perspective view of an example container, in accordance with some aspects.
Figure 13:
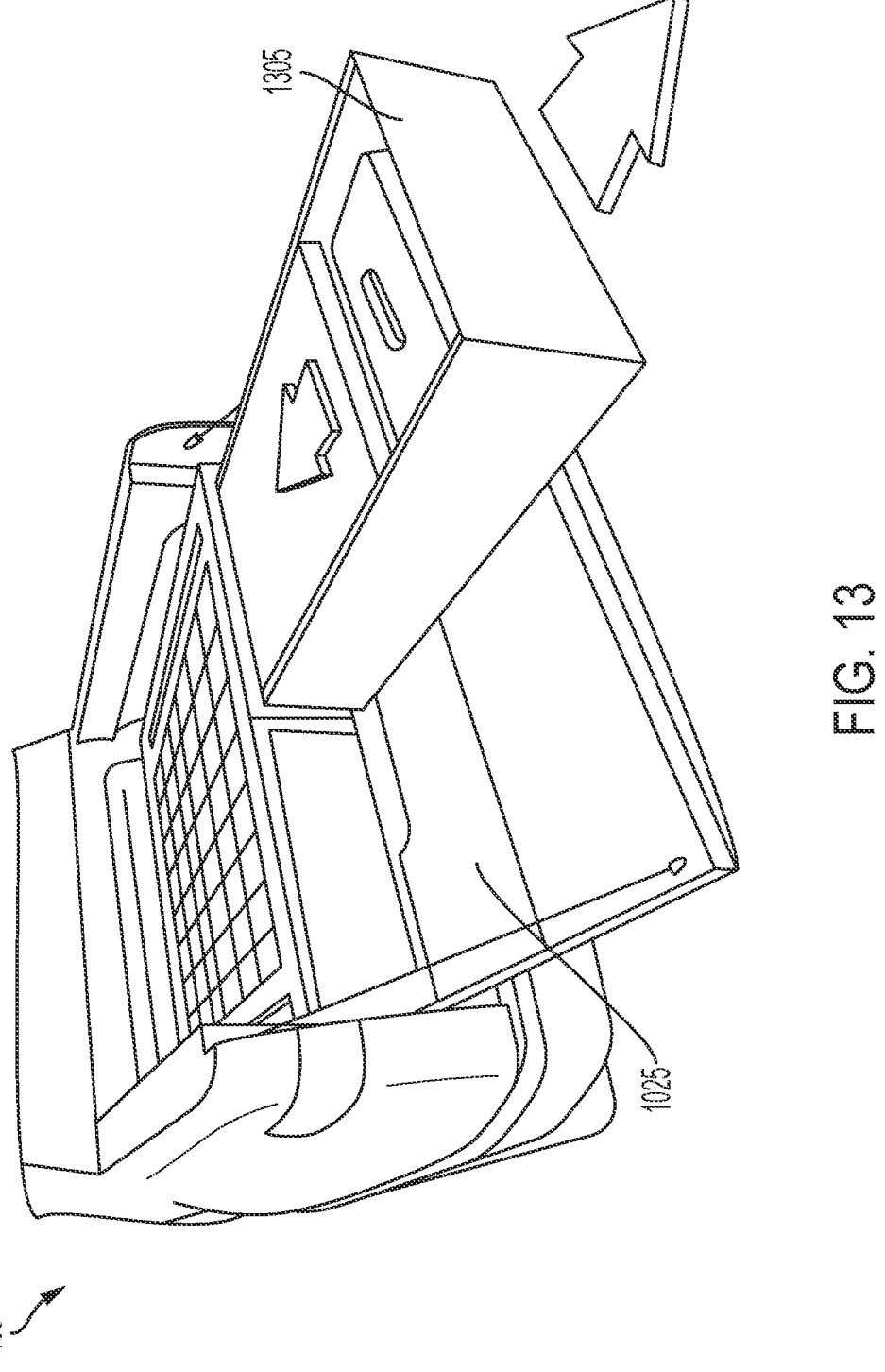
FIG. 13 depicts a perspective view of an example container, in accordance with some aspects.
Figure 14:
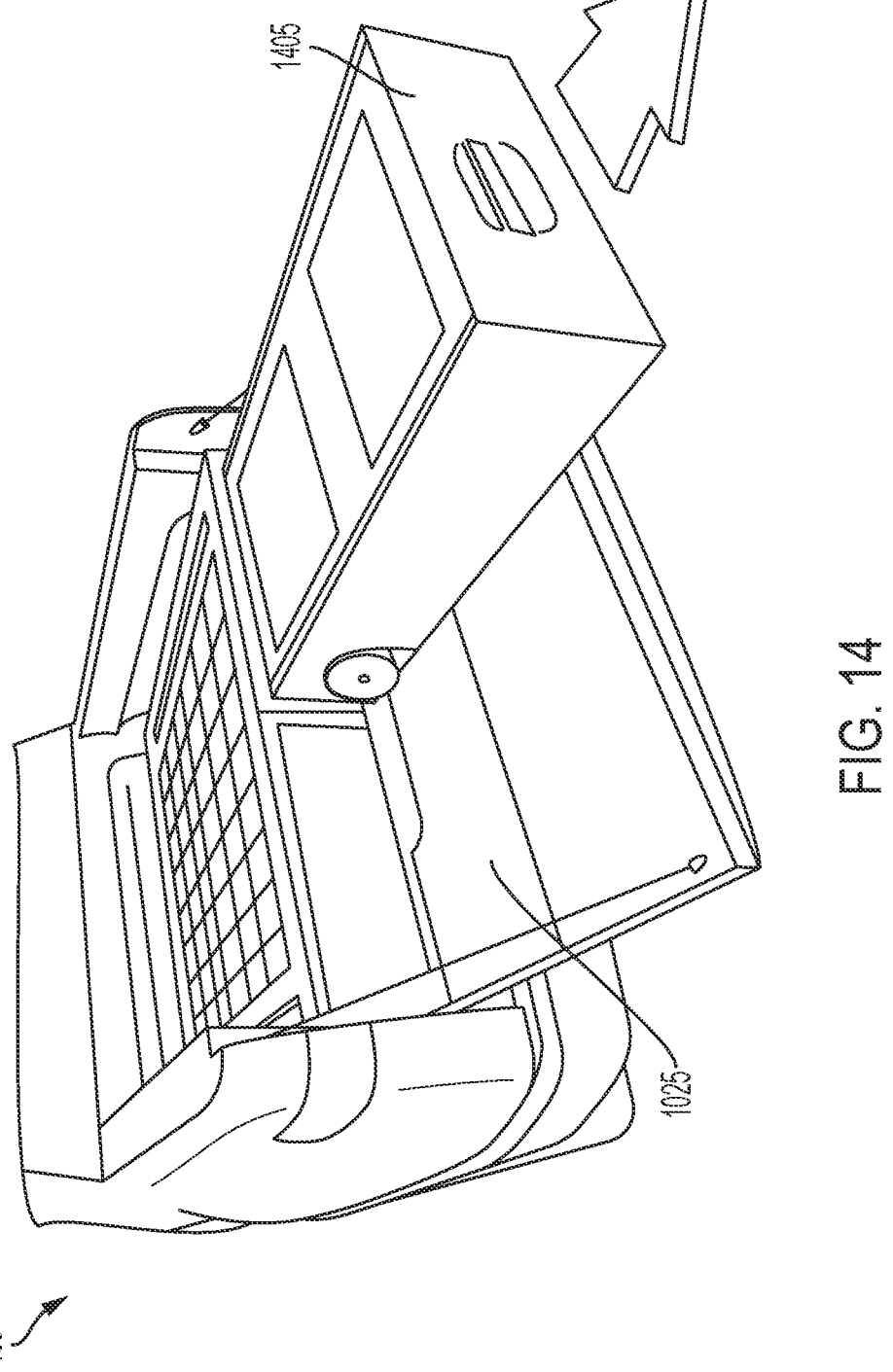
FIG. 14 depicts a perspective view of an example container, in accordance with some aspects.
Figure 15:
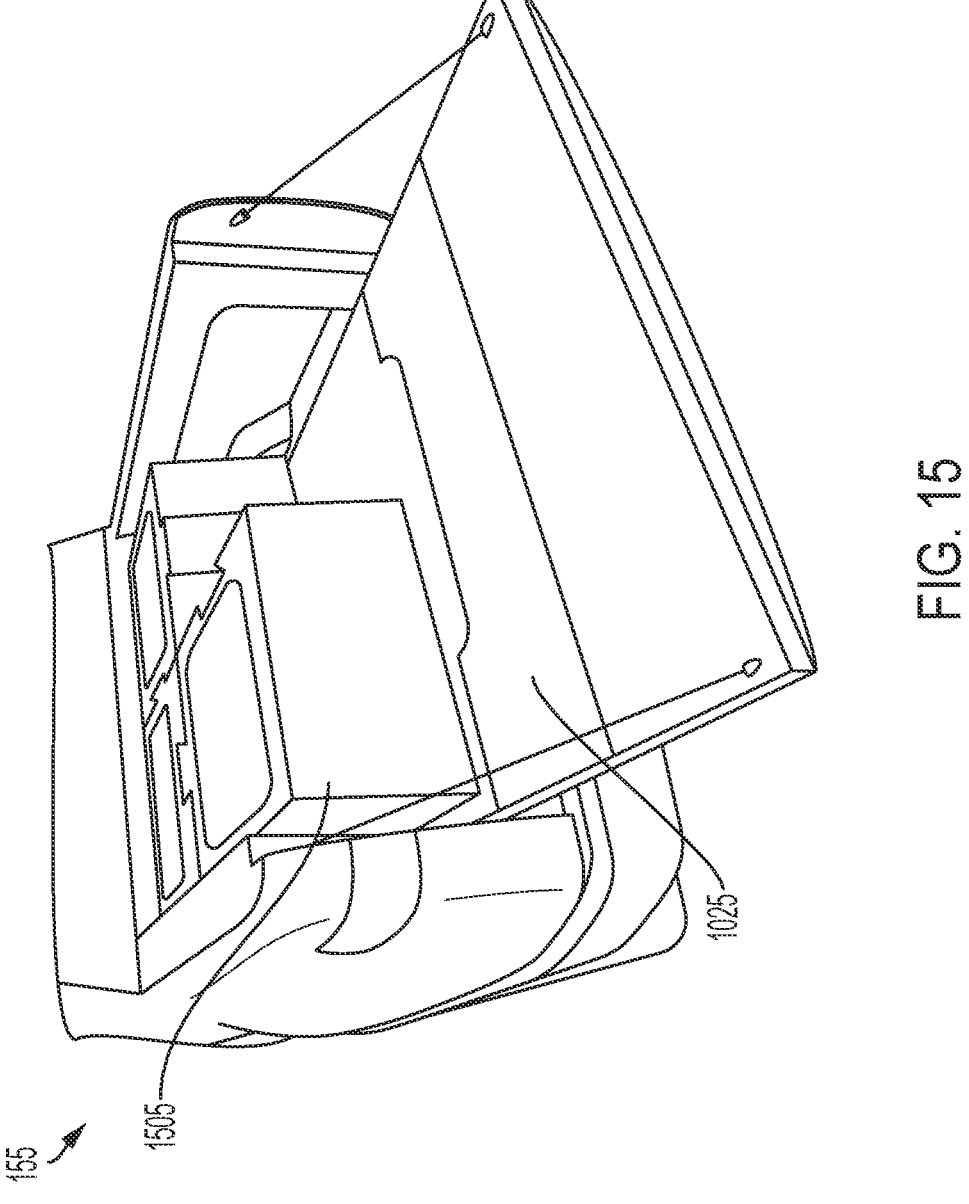
FIG. 15 depicts a perspective view of example containers, in accordance with some aspects.

FIG. 10 depicts an example truck bed 155. The truck bed 155 can include a front wall 1005 and a back wall 1010 disposed opposite the front wall 1005. The back wall 1010 can move between a first (e.g., closed) position and a second (e.g., open) position. The truck bed 155 can include a first side wall 1015 and a second sidewall 1020. The first and second sidewalls 1015, 1020 can extend between the front wall 1005 and the back wall 1010. The truck bed 155 can include a bed surface 1025. The bed surface 1025 can define a bottom of the truck bed 155.

The truck bed 155 can include at least one latch mechanism 200. For example, the latch mechanism 200 can be disposed on a top of a sidewall 1015, 1020. Each sidewall 1015, 1020 can have a plurality of latch mechanisms 200. The truck bed 155 can include at least one latch mechanism 900. For example the latch mechanism 900 can be disposed on an interior side of a sidewall 1015, 1020. Each sidewall 1015, 1020 can have a plurality of latch mechanisms 900.

FIGS. 11-15 depict perspective views of the truck bed 155. The truck bed 155 can receive at least one container. The container can be, for example, box 1105, box 1205, box 1305, box 1405, or box 1505. At least a portion of the container can be disposed in the truck bed 155. The container can have any shape, size, or configuration. The container can be fixed in a desired position within the truck bed 155 via at least one latch mechanism 200 or at least one latch mechanism 900.

Figure 16:
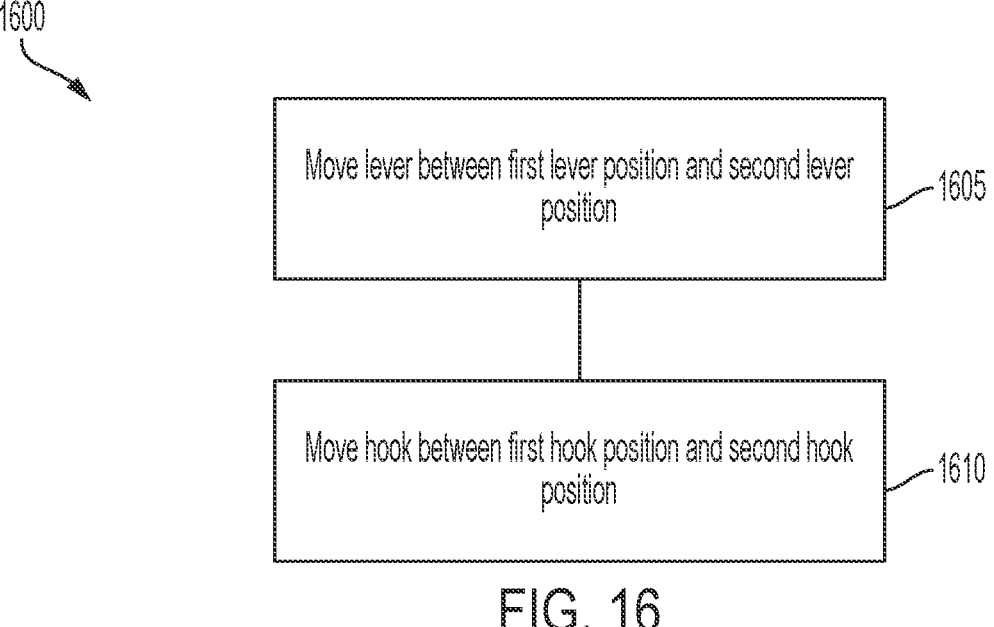
FIG. 16 depicts a flow diagram illustrating an example method to move a hook and a lever of an apparatus, in accordance with some aspects.

FIG. 16 depicts an example method 1600 to actuate a latch mechanism (e.g., latch mechanism 200). Method 1600 can include moving a lever from a first lever position to a second lever position (Act 1605) and moving a hook from a first hook position to a second hook position (Act 1610). Act 1605 of moving a lever can include moving lever 225. Moving lever 225 can include applying a force to the handle 230 of the lever 225. Act 1605 can include rotating the lever 225 around a lever rotation point 255. The first lever position can be an open, unlatched position and the second lever position can be a closed, latched position.

Act 1610 of moving a hook can include moving hook 205. Moving the lever 225 can cause movement of the hook 205. For example, a link 265 can couple the lever 225 with the hook 205. As the lever 225 rotates about the lever rotation point 255, the link 265 can move such that the hook 205 can move. The hook 205 can rotate about the hook rotation point 207. The first hook position can be an open, unlatched position and the second hook position can be a closed, latched position. Moving the hook 205 between the first hook position and the second hook position can include receiving an external component 405 within a pocket 212 of the hook 205.

Method 1600 can include creating an over-centering effect. The over-centering effect can cause a force that is applied to the hook 205 too cause the lever 225 to move more toward the second position, further securing the hook 205 around the external object. Creating an over-centering effect can include moving a lever point 250 of the lever 225 to be on the same side of the lever rotation point 255 as a hook point 220. For example, prior to moving the hook 205, the hook point 220 can be disposed above the lever rotation point 255 and the lever point 250 can be disposed below the lever rotation point 255. Creating the over-centering effect can include rotating the lever 225 such that the lever point 250 and the hook point 220 are both disposed above the lever rotation point 255.

Figure 25:
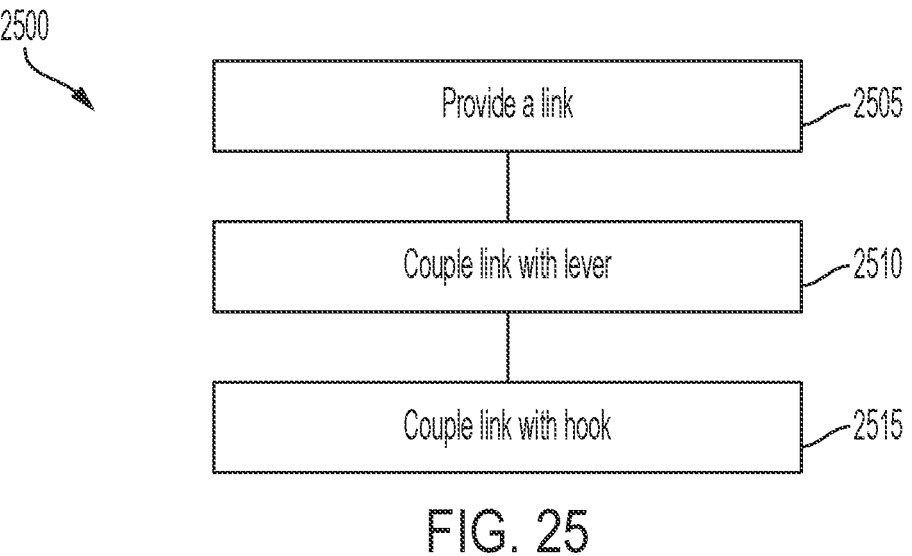
FIG. 25 depicts a flow diagram illustrating an example method of assembling a latch mechanism, in accordance with some aspects.

FIG. 25 depicts an example method 2500 to assemble a latch mechanism (e.g., latch mechanism 200). Method 2500 can include providing a link 265 (Act 2505). The link 265 can have a first link end 305 and a second link end 310. The link 265 can include a lever portion 2405 and a hook portion 2410. The lever portion 2405 can define a first pocket 2430. The hook portion 2410 can define a second pocket 2440. Act 2505 can include providing a compliant member. The compliant member can facilitate movement of the hook 205 between the first hook position and the second hook position with various external components. For example, the compliant member can be a spring 2415. The spring 2415 can be disposed between and extend the lever portion 2405 and the hook portion 2410. The spring 2415 can be disposed, at least partially, in both the first pocket 2430 and the second pocket 2440. The compliant member can be a gasket 635. The gasket 635 can be disposed around a housing 605. The housing 605 can receive at least a portion of the link 265.

Method 2500 can include coupling the link 265 with a lever 225 (Act 2510). The link 265 can couple with the lever 225 via the first link end 305 of the link 265. Method 2500 can include coupling the link 265 with a hook 205 (Act 2515). The link 265 can couple with the hook 205 via the second link end 310 of the link 265. The lever 225 can move the hook 205 between a first hook position and a second hook position. An axis (e.g., connection point axis 410) can extend between a hook point 220 and a lever point 250. Act 2515 can include orienting the hook 205 relative to the lever 225 such that a lever rotation point 255 can be disposed on a first side of the connection point axis 410 with the hook 205 in the first hook position and the lever rotation point 255 can be disposed on a second side of the connection point axis 410 with the hook 205 in the second hook position. Act 2515 can include arranging the lever 225, link 265, and the hook 205 such that a first distance (e.g., hook distance 520) between a center of a hook rotation point 207 and a connection point axis 410 can decrease and a second distance (e.g., lever distance 525) between a center of a lever rotation point 255 and the connection point axis 410 can increase as the hook 205 moves from the first hook position to the second hook position. Act 2515 can include arranging the lever 225, link 265, and the hook 205 such that rotation of the hook 205 in a first direction can cause rotation of the lever 225 in a second direction with the hook 205 in the first hook position and rotation of the lever 225 in the first direction with the hook 205 in the second position. The first direction can be opposite the second direction.

Act 2515 can include providing a housing 605. The housing 605 can define a cavity 615. The hook 205 can be disposed at least partially in the cavity 615. The link 265 can be disposed at least partially in the cavity 615. A spring (e.g., bias spring 620) can be coupled with at least one of the hook 205 or the link 265. The bias spring 620 can bias the hook 205 to the second position.

Figure 17:
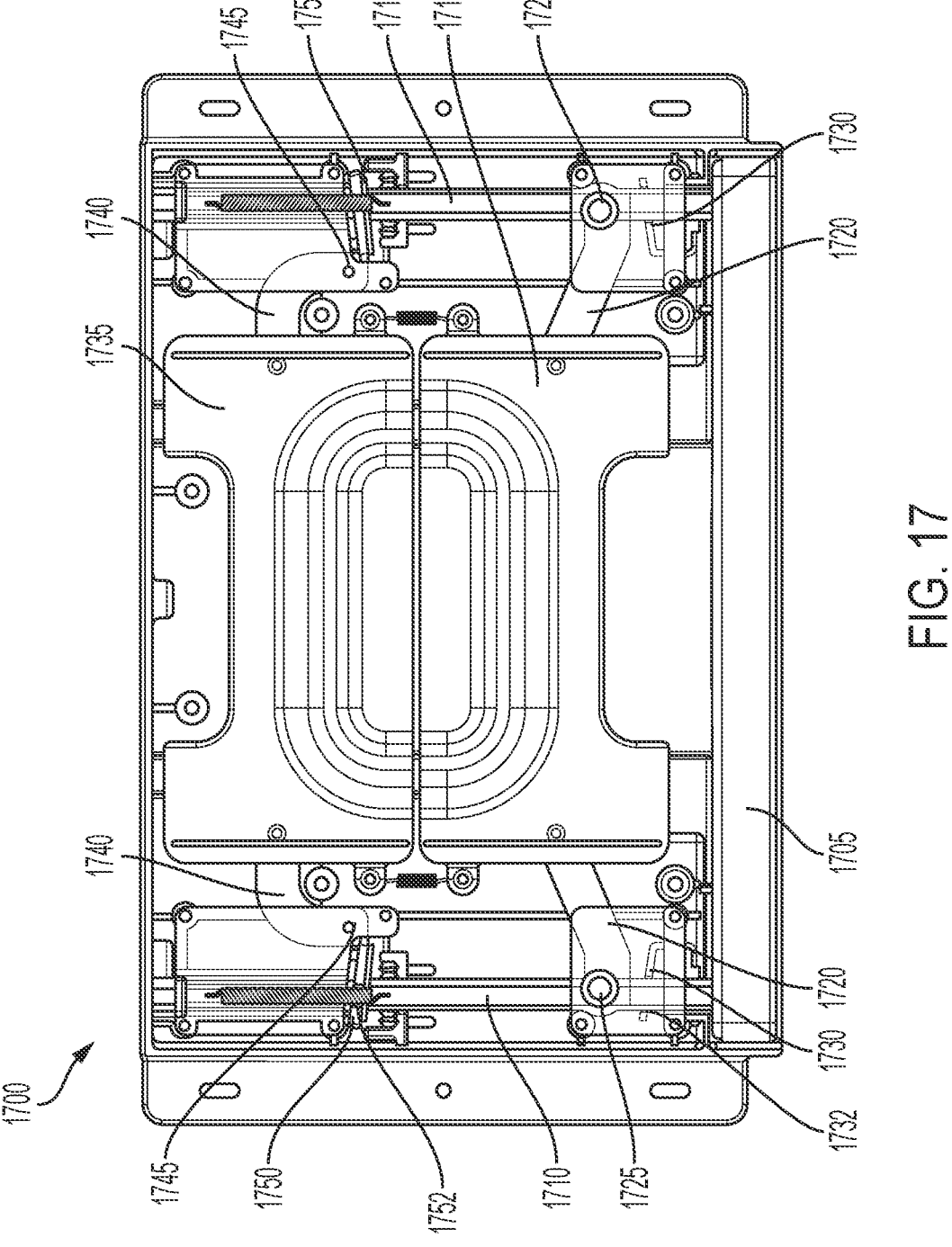
FIG. 17 depicts a front view of an example apparatus, in accordance with some aspects.

FIG. 17 depicts a front view of an apparatus, shown as clamp mechanism 1700. Clamp mechanism 1700 can include at least one clamp member 1705. The clamp member 1705 can extend between a first side and a second side of the clamp mechanism 1700. The clamp member 1705 can be disposed at a bottom of the clamp mechanism 1700. The clamp member 1705 can move between a first position and a second position (e.g. a first clamp position and a second clamp position). The clamp member 1705 can move laterally (e.g., up and down) between the first clamp position and the second clamp position. The first clamp position can be a retracted or stored position. In the first clamp position, the clamp member 1705 can interface with or be aligned with the bottom of the clamp mechanism 1700. The second clamp position can be an extended position. In the second clamp position, the clamp member 1705 can extend down and beyond the bottom of the clamp mechanism 1700. The clamp member 1705 can be coupled with at least one post 1710. The post 1710 can extend out of the clamp mechanism 1700 and retract into the clamp mechanism 1700 to move the clamp member 1705 between the first clamp position and the second clamp position. The clamp member 1705 can contact a surface when in the second position. For example, the clamp member 1705 can apply a force to a surface of an object when in the second position.

The clamp member 1705 can couple with a plurality of posts 1710. For example, the clamp member 1705 can be an elongated member. A first post 1710 and a second post 1710 can be coupled with the clamp member 1705. The first post 1710 can at or proximate to a first end of the clamp member 1705 and the second post can be at or proximate to a second, opposite end of the clamp member 1705. The posts 1710 can move in and out of the clamp mechanism 1700 to move the clamp member 1705 between the first clamp position and the second clamp position.

The clamp mechanism 1700 can include at least one force member 1715. The force member 1715 can be disposed above the clamp member 1705, with reference to FIG. 17. The force member 1715 can move between a first position and a second position (e.g., an unactuated position and an actuated position). The force member 1715 can translate (e.g., move up and down) between the first position and the second position. Actuation of the force member 1715 can increase the force that the clamp member 1705 applies to the surface of the object. For example, the clamp mechanism 1700 can include at least one clamp lever 1720. The clamp lever 1720 can be coupled with the force member 1715. The clamp lever 1720 can pivot around a clamp pivot point 1725. Movement of the force member 1715 can cause the clamp lever 1720 to pivot around the clamp pivot point 1725.

The clamp mechanism 1700 can include at least one clamp plate 1730. The clamp plate 1730 can have at least one opening (e.g., a clamp plate opening 1732) through which the post 1710 can extend. The clamp plate 1730 can move between a first position and a second position (e.g., a first clamp plate position and a second clamp plate position). The first clamp plate position can be an open or release position and the second position can be a closed or locked position. In the open position, the post 1710 can translate through the clamp plate opening 1732. In the locked position, the clamp plate 1730 can prevent or inhibit the post 1710 from translating through the clamp plate opening 1732. For example, in the open position, the clamp plate 1730 can be in a more perpendicular position relative to the post 1710 (e.g., a horizontal position with reference to FIG. 17) than the locked position such that a cross-sectional area of the clamp plate opening 1732 through which the post 1710 can translate is greater than when the clamp plate 1730 is oriented at an angle relative to the post 1710. In the locked position, an inner surface of the clamp plate opening 1732 can interface with the post 1710 to prevent or inhibit the post from translating through the clamp plate opening 1732.

Rotation of the clamp lever 1720 can cause the clamp lever 1720 to move the clamp plate 1730. For example, the clamp lever 1720 can move the clamp plate 1730 between the open and locked positions. Moving the clamp plate 1730 from the open position to the locked position can cause the post 1710 to translate in the direction of the clamp member 1705 to increase the force that the clamp member 1705 applies to the object. The amount of force applied to the object can increase based on how far the post 1710 moves. How far the post 1710 moves can be based on how far the clamp plate 1730 moves or how many times the clamp plate

1730 moves. For example, the post 1710 can move incrementally each time the force member 1715 moves the clamp lever 1720, which can move the clamp plate 1730. The force member 1715 can continue to move back and forth between a first position and a second position to continue to rotate the clamp lever 1720 back and forth to continue to move the clamp plate 1730, and therefore the post 1710, and increase the force on the object.

The clamp mechanism 1700 can include at least one release member 1735. The release member 1735 can be disposed away from the clamp member 1705. The force member 1715 can be disposed between the release member 1735 and the clamp member 1705. The release member 1735 can release the clamp member 1705 such that the clamp member 1705 can stop applying a force to the object and retract back toward the clamp mechanism 1700 (e.g., to a stored position). For example, the release member 1735 can move between a first position and a second position (e.g., a first release position and a second release position). The first release position can be an unactuated position and the second release position can be an actuated position. Actuation of the release member 1735 (e.g., movement from the first position to the second position) can return the clamp member 1705 from the second clamp position to the first clamp position. For example, actuation of the release member 1735 can cause the post 1710 to retract into the clamp mechanism 1700 and pull the clamp member 1705 toward the clamp mechanism 1700.

The clamp mechanism 1700 can include at least one release lever 1740. The release lever 1740 can be coupled with the release member 1735. The release lever 1740 can rotate around a release pivot point 1745. Movement of the release member 1735 can cause the release lever 1740 to rotate around the release pivot point 1745.

The clamp mechanism 1700 can include at least one release plate 1750. The release plate 1750 can include at least one opening (e.g., release plate opening 1752) through which the post 1710 can extend. The release plate 1750 can move between a first position and a second position (e.g., a first release plate position and a second release plate position). The first release plate position can be a closed or locked position and the second release plate position can be an open or release position. In the locked position, the release plate 1750 can prevent or inhibit the post 1710 from translating through the release plate opening 1752. For example, in the open position, the release plate 1750 can be in a more perpendicular position relative to the post 1710 (e.g., a horizontal position with reference to FIG. 17) than the locked position such that a cross-sectional area of the release plate opening 1752 through which the post 1710 can translate is greater than when the clamp plate 1730 is oriented at an angle relative to the post 1710. In the locked position, an inner surface of the release plate opening 1752 can interface with the post 1710 to prevent or inhibit the post from translating through the release plate opening 1752.

The release member 1735 can move the release plate 1750 between the locked position and the open position. For example, the release member 1735 can interface with the release plate 1750 either directly or indirectly (e.g., via the release lever 1740. Rotation of the release lever 1740 can cause the release lever 1740 to move the release plate 1750. For example, the release lever 1740 can move the release plate 1750 between the open and locked positions. Moving the release plate 1750 from the locked position to the open position can cause the post 1710 to translate in a direction away from the clamp member 1705 to retract the clamp member 1705 and release the force applied to an object.

The clamp mechanism 1700 can include a plurality of clamp levers 1720 and clamp plates 1730. For example, the clamp mechanism 1700 can include a first post 1710 and a second post 1710. The first post 1710 can extend through an opening of a first clamp plate 1730 and the second post 1710 can extend through an opening of a second clamp plate 1730. A first clamp lever 1720 and a second clamp lever 1720 can couple with the force member 1715. The first clamp lever 1720 can be disposed on a first side of the force member 1715 and the second clamp lever 1720 can be disposed on a second side (e.g., opposite side) the force member 1715. Rotation of the first clamp lever 1720 around a first clamp pivot point 1725 can cause the first clamp plate 1730 to move along the first post 1710 toward the clamp member 1705. Rotation of the second clamp lever 1720 around a second clamp pivot point 1725 can cause the second clamp plate 1730 to move along the second post 1710 toward the clamp member 1705. Movement of the first and second clamp plates 1730 can be simultaneous. Movement of the first and second clamp plates 1730 can increase the force that the clamp member 1705 can apply to an object.

The clamp mechanism 1700 can include a plurality of release levers 1740 and release plates 1750. For example, the clamp mechanism 1700 can include a first post 1710 and a second post 1710. The first post 1710 can extend through an opening of a first release plate 1750 and the second post 1710 can extend through an opening of a second release plate 1750. A first release lever 1740 and a second release lever 1740 can couple with the release member 1735. The first release lever 1740 can be disposed on a first side of the release member 1735. The second release lever 1740 can be disposed on a second side (e.g., opposite side) of the release member 1735. Rotation of the first release lever 1740 around a first release pivot point 1745 can cause the first release plate 1750 to move from a locking position to a release position. Rotation of the second release lever 1740 around a second release pivot point 1745 can cause the second release plate 1750 to move from a locking position to a release position. Movement of the first and second release plates 1750 can be simultaneous. Movement of the first and second release plates 1750 can remove the force that the clamp member 1705 was applying to an object. For example, movement of the first and second release plates 1750 can allow the first and second posts 1710 to move through the openings of the first and second release plates 1750 into the clamp mechanism 1700 to retract the clamp member 1705.

Figure 18:
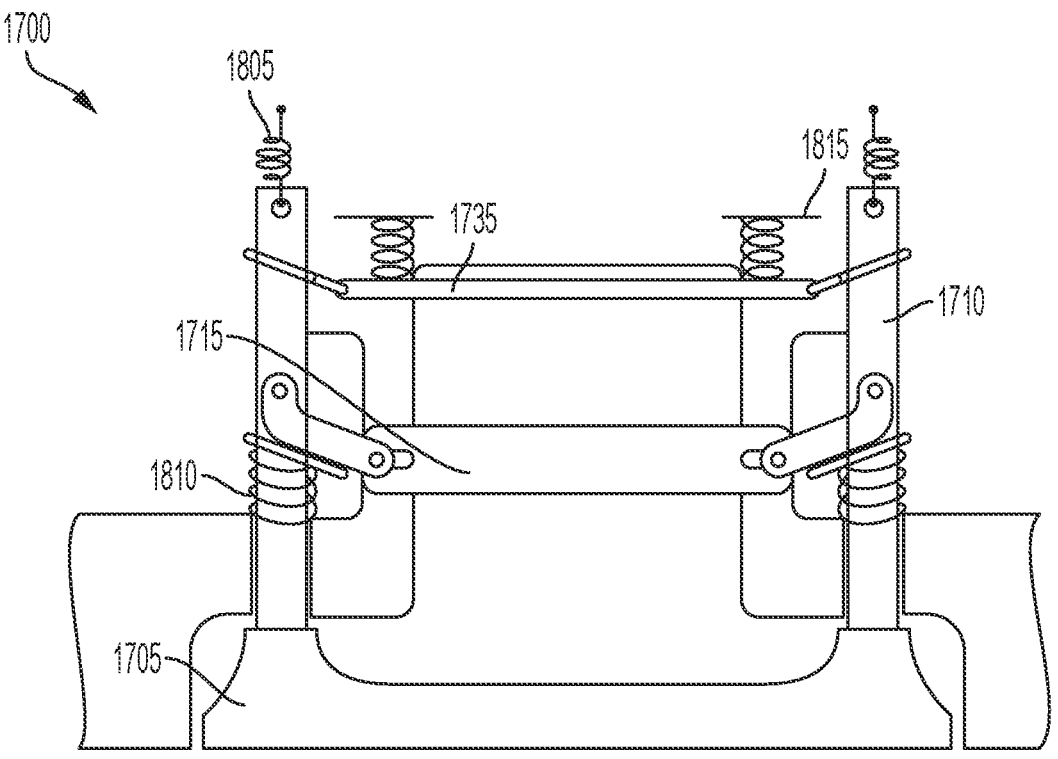
FIG. 18 depicts a front view of an example apparatus, in accordance with some aspects.

FIG. 18 depicts a front view of the clamp mechanism 1700. The clamp mechanism 1700 can include at least one biasing member. For example, the clamp mechanism 1700 can include at least one clamp biasing member 1805. The clamp biasing member 1805 can be, for example, a spring. The clamp biasing member 1805 can bias the clamp member 1705 in a first direction. For example, the clamp biasing member 1805 can bias the clamp member 1705 to the first clamp position (e.g., a retracted or stored position). The clamp member 1705 can receive an external force greater than a biasing force of the clamp biasing member 1805 to move to the second clamp position (e.g., extended or clamping position). The clamp biasing member 1805 can be coupled with a post 1710. For example, the clamp biasing member 1805 can couple with an end of the post 1710 that is opposite the clamp member 1705. The clamp biasing member 1805 can bias the post 1710 in the first direction to pull the post 1710 into the clamp mechanism 1700 and retract the clamp member 1705 to the first clamp position.

The clamp mechanism 1700 can include at least one force biasing member 1810. The force biasing member 1810 can be, for example, a spring. The force biasing member 1810 can bias the clamp plate 1730 to the first clamp plate position (e.g., open position). The force biasing member 1810 can bias the force member 1715 to the first position (e.g., unactuated position). For example, the force biasing member 1810 can bias the force member 1715 in the first direction (e.g., the same direction as the clamp biasing member 1805). The force member 1715 can receive an external force greater than a biasing force of the force biasing member 1810 to move to the second position (e.g., actuated position). The force biasing member 1810 can be coupled with or disposed around the post 1710. The force biasing member 1810 can be disposed between the clamp plate 1730 and the clamp member 1705. The clamp mechanism 1700 can include at least one release biasing member 1815. The release biasing member 1815 can be, for example, a spring. The release biasing member 1815 can bias the release plate 1750 to the first release plate position (e.g., locked position). The release biasing member 1815 can bias the release member 1735 to the first position (e.g., unactuated position). For example, the release biasing member 1815 can bias the release member 1735 in a second direction. The second direction can be opposite the first direction. For example, with reference to FIG. 17, the clamp biasing member 1805 can bias the clamp member 1705 in an upward direction. The force biasing member 1810 can bias the force member 1715 in an upward direction. The release biasing member 1815 can bias the release member 1735 in a downward direction. The release member 1735 can receive an external force greater than a biasing force of the release biasing member 1815 to move to the release position. The release biasing member 1815 can be coupled with or interface with the release member 1735. For example, the release biasing member 1815 can be disposed between the release member 1735 and an opposing surface. The opposing surface can be, for example, a housing of the clamp mechanism 1700.

The clamp plate 1730 and the release plate 1750, and the corresponding biasing members, can work together to keep the post 1710, and therefore the clamp member 1705, in a desired position. For example, the release biasing member 1815 can bias the release plate 1750 to a locked position and the clamp biasing member 1810 can bias the clamp plate 1730 to an open position. With the release plate 1750 in the locked position, the clamp plate 1730 can move between the open position and the closed position to move the post 1710 in the direction of the clamp member 1705 and the release plate 1750 can prevent the post 1710 from moving back to the retracted position when the clamp plate 1730 is in the open position. With the clamp plate 1730 in the biased open position, when the release plate 1750 moves to the open position, the post 1710 can translate through both the clamp plate opening 1732 and the release plate opening 1752 to retract the clamp member 1705 to the stored position.

Figure 19:
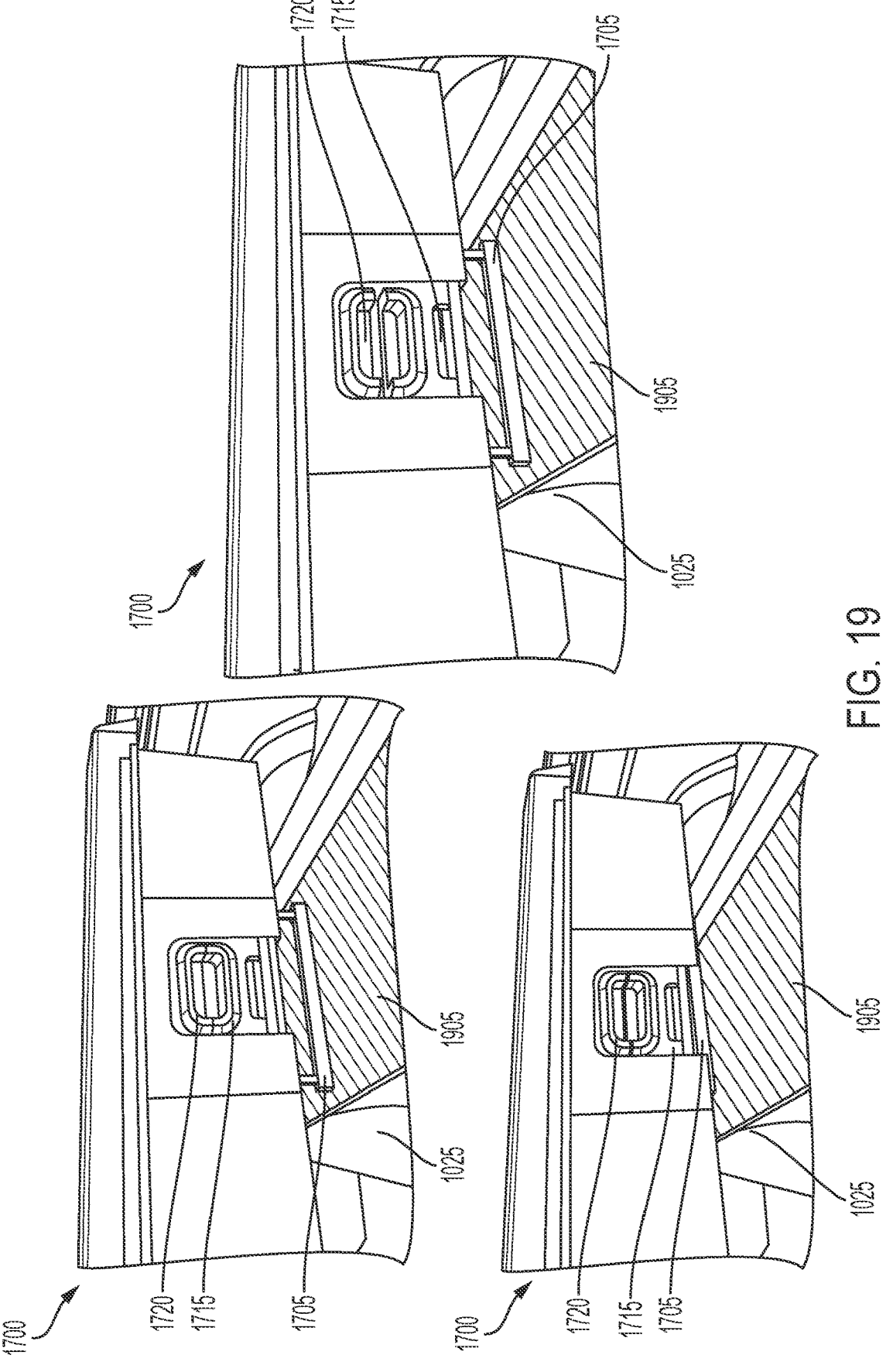
FIG. 19 depicts perspective views of an example apparatus, in accordance with some aspects.

FIG. 19 depicts front perspective view of the clamp mechanism 1700. A force can be applied to the clamp member 1705 to move the clamp member 1705 from the first clamp position to the second clamp position. The post 1710 can extend below the clamp mechanism 1700 with the clamp member 1705 in the second clamp position. The clamp member 1705 can apply a force to at least one object, shown as panel 1905, in the second position. The clamp member 1705 can be locked in the second position (e.g., via the release plate 1750 being in the locked position). With the clamp member 1705 in the second clamp position, a force can be applied to the force member 1715 to move the force member 1715 from the first clamp position to the second clamp position. The force member 1715 moving from the first clamp position to the second clamp position can increase a force applied to the panel 1905 via the clamp member 1705 (e.g., by moving the clamp plate 1730 along the post 1710). With the clamp member 1705 in the second clamp position, a force can be applied to the release member 1735 to move the release member 1735 between a first release position and a second release position. Moving the release member 1735 can unlock the clamp member 1705 such that the post 1710 can retract back into the clamp mechanism 1700 and the clamp member 1705 can move back toward the clamp mechanism 1700. For example, moving the release member 1735 can cause the release plate 1750 to move into the release position such that the post 1710 can slide through the opening of the release plate 1750 and retract the clamp member 1705 to the first clamp position.

Figure 20:
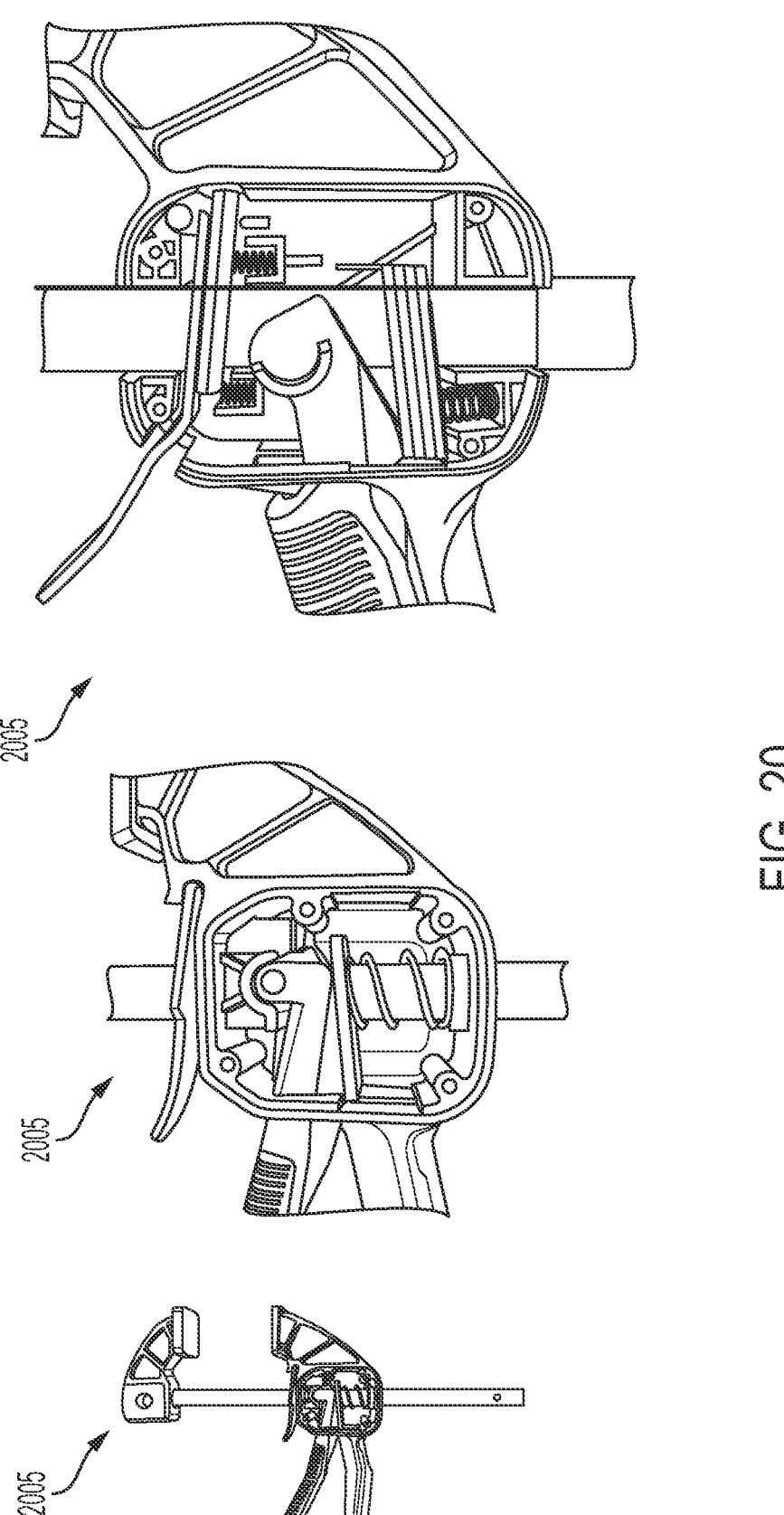
FIG. 20 depicts a front view of an example toggle clamp, in accordance with some aspects.

FIG. 20 depicts an example toggle clamp 2005. The clamp mechanism 1700 can include at least one toggle clamp 2005. For example, the force member 1715 can comprise the toggle clamp 2005 to increase the pressure that the clamp member 1705 can apply to the surface when in the second position.

Figure 21:
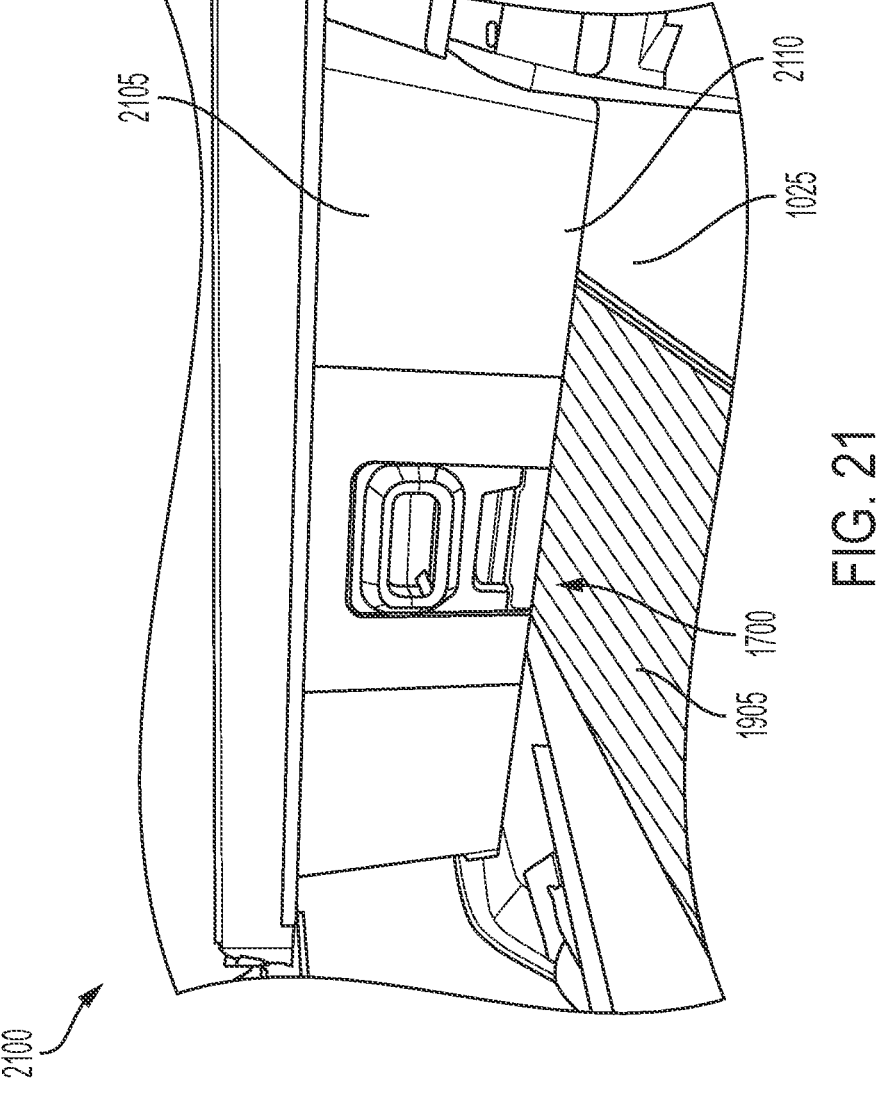
FIG. 21 depicts a perspective view of an example container, in accordance with some aspects.

FIG. 21 depicts a front perspective view of an example container 2100. The container 2100 can be, for example, a bed box to be disposed in the truck bed 155 of an electric vehicle 105, or any other vehicle. The container 2100 can be, for example, any of boxes 1105, 1205, 1305, 1405, or 1505. The container 2100 can include the clamp mechanism 1700. For example, the container 2100 can include a side surface 2105. The clamp mechanism 1700 can be a part of or be disposed on the side surface 2105. The container 2100 can include a bottom surface 2110. The container 2100 can be positioned such that a space is left between the bottom surface 2110 and the bed surface 1025. The panel 1905 can be at least partially disposed in the space between the bottom surface 2110 and the bed surface 1025 such that the clamp member 1705 of the clamp mechanism 1700 can extend beyond the bottom surface 2110 and contact a surface of the object. A force applied to the surface of the object can be increased via the actuation of the force member 1715 of the clamp mechanism 1700. The force can be released from the surface of the object via actuation of the release member 1735 of the clamp mechanism 1700.

Figure 22:
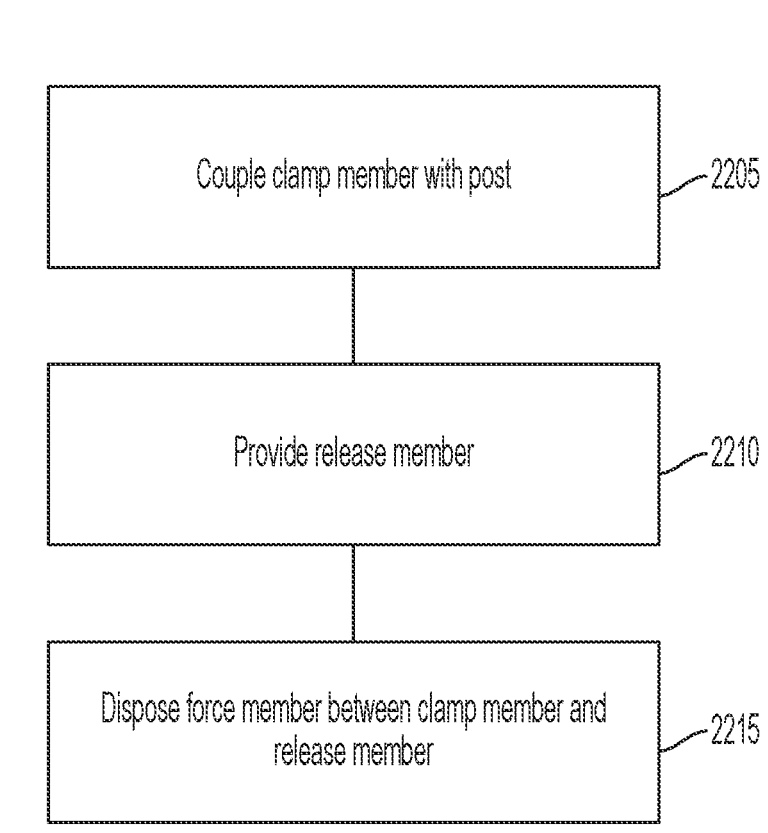
FIG. 22 depicts a flow diagram illustrating an example method of assembling a clamp mechanism, in accordance with some aspects.

FIG. 22 depicts an example method 2200 to assemble a clamp mechanism 1700. The method 2200 including coupling a clamp member 1705 with at least one post 1710 (Act 2205). The post 1710 can translate to move the clamp member 1705 between a first clamp position and a second clamp position. The clamp member 1705 can apply a force to an object in the second clamp position. At act 2205, the clamp member 1705 can be coupled with a plurality of posts 1710. For example, the clamp member 1705 can be coupled with a first post 1710 and a second post 1710.

Act 2205 of coupling the clamp member 1705 with the post 1710 can include biasing the clamp member 1705 in a first direction. For example, act 2205 can include providing at least one clamp biasing member 1805. The clamp biasing member 1805 can bias the clamp member 1705 in a first direction. The first direction can be toward the first clamp position (e.g., a retracted position) (e.g., upward).

Method 2200 can include providing a release member 1735 (Act 2210). The release member 1735 can control a position of the post 1710. The release member 1735 can facilitate movement of the clamp member 1705 from the second clamp position to the first clamp position to remove the force applied to the object. For example, act 2210 can include coupling the release member 1735 with a release plate 1750. The release member 1735 can be coupled with the release plate 1750 directly or indirectly (e.g., via a release lever 1740). The release lever 1740 can rotate around a release pivot point 1745 to release the force from being applied to the object. Coupling the release member 1735 with the post 1710 can include coupling a first end of the release lever 1740 with the release member 1735 and coupling a second end of the release lever 1740 with a release plate 1750. Act 2210 can include extending the post 1710 through a release plate opening 1752 of the release plate 1750. The release plate 1750 can be oriented at an angle relative to the post 1710. The angle of the release plate 1750 relative to the post 1710 can prevent the post 1710 from retracting the clamp member 1705 to the first clamp position. Translation of the release member 1735 can rotate the release lever 1740 and flatten the angle of the release plate 1750 to allow the post 1710 to translate through an opening of the release plate 1750 and retract the clamp member 1705 from the second clamp position to the first clamp position. The release member 1735 can be coupled with a plurality of posts 1710. For example, the release member 1735 can be coupled with a first post 1710 and a second post 1710. The release member 1735 can be coupled with a first release lever 1740 to couple with the first post 1710 and a second release lever 1740 to couple with the second post 1710. The release member 1735 can be disposed between the first post 1710 and the second post 1710.

Act 2210 of coupling the release member 1735 with the post 1710 can include biasing the release member 1735 in a second direction. For example, act 2210 can include providing at least one release biasing member 1815. The release biasing member 1815 can bias the release member 1735 in a second direction. The second direction can be opposite the first direction of the clamp member 1705. The second direction can be toward the clamp member 1705 (e.g., downward).

Method 2200 can include disposing a force member 1715 between the clamp member 1705 and the release member 1735 (Act 2215). The force member 1715 can adjust the force applied to an object with the clamp member 1705 in the second clamp position. For example, the force member 1715 can increase the force applied by the clamp member 1705. Act 2215 can include coupling the force member 1715 with the post 1710. The force member 1715 can be coupled with the post 1710 via a clamp lever 1720. The clamp lever 1720 can rotate around a clamp pivot point 1725 to increase the force applied to the object via the clamp member 1705. The force member 1715 can be coupled with a plurality of posts 1710. For example, the force member 1715 can be coupled with a first post 1710 and a second post 1710. The force member 1715 can be coupled with a first clamp lever 1720 to couple with the first post 1710 and a second clamp lever 1720 to couple with the second post 1710. The force member 1715 can be disposed between the first post 1710 and the second post 1710.

Act 2215 of disposing the force member 1715 between the clamp member 1705 and the release member 1735 can include biasing the force member 1715 in a first direction. For example, act 2215 can include providing at least one force biasing member 1810. The force biasing member 1810 can bias the force member 1715 in the first direction (e.g., the same direction as the clamp biasing member 1805) (e.g., upward).

Figure 23:
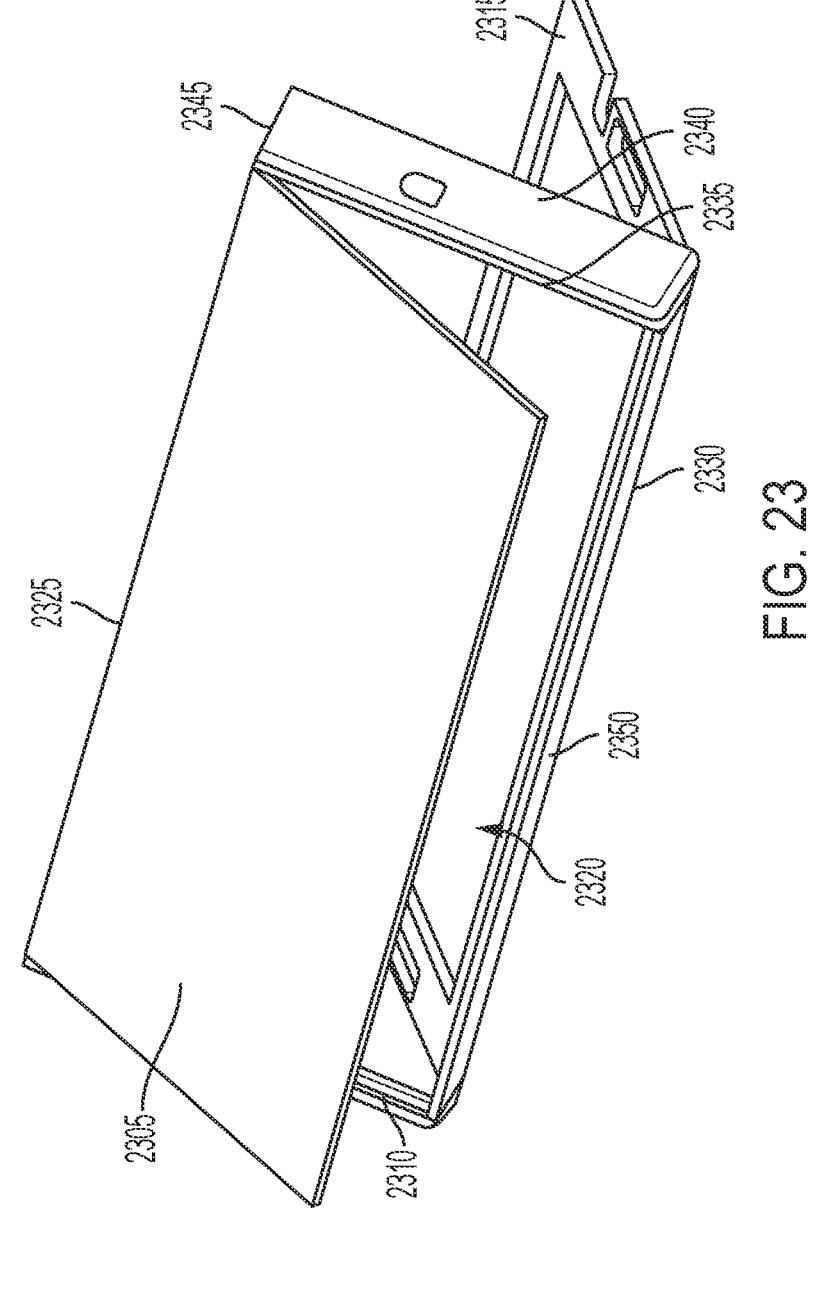
FIG. 23 depicts a perspective view of an example apparatus, in accordance with some aspects.

FIG. 23 depicts an apparatus, shown as container 2300. The container 2300 can be opened from a plurality of sides of the container 2300. For example, the container 2300 can include a lid 2305, a frame 2310, and a base 2315. The frame 2310 can define a cavity 2320. The frame 2310 can include at least one top edge 2325 and at least one bottom edge 2330. The lid 2305 can be coupled with the frame 2310 via top edge 2325. The lid 2305 can rotate around the top edge 2325 to move between a first lid position and a second lid position. For example, the frame 2310 can have a top 2335 and a bottom 2340. The first lid position can enclose the frame 2310 and the second lid position can expose the cavity 2320 via the top 2335 of the frame 2310. The base 2315 can couple with the frame 2310 via the bottom edge 2330. The base 2315 can rotate around the bottom edge 2330 to move between a first base position and a second base position. For example, the first base position can enclose the frame 2310 and the second base position can expose the cavity 2320 via the bottom 2340 of the frame 2310. The frame 2310 can include a front 2345 and a back 2350. The top edge 2325 can be disposed at the front 2345 of the frame 2310. The bottom edge 2330 can be disposed at the back 2350 of the frame 2310. As such, the cavity 2320 of the container 2300 can be accessed via both the lid 2305 and the base 2315.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. For example, axes are provided for example purposes and should not be interpreted as limiting. Other substitutions, modifications, changes and omissions can also be made in the design, operating conditions and arrangement of the disclosed elements and operations without departing from the scope of the present disclosure.

For example, descriptions of above and below, or bottom and top, among other relative orientations can be reversed. References to the electric vehicle 105 can include internal combustion engine vehicles that can include the apparatus as described herein. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
a clamp member to apply a force to an object, the clamp member to move in a first direction to apply the force to the object;
a release member to release the force from the object, the release member to move in a second direction to return the clamp member to a stored position, the second direction opposite the first direction; and
a force member to increase the force applied to the object via the clamp member, the force member to move in the first direction to increase the force applied to the object.

2. The apparatus of claim 1, comprising:
a clamp plate, the release member to move the clamp plate;
a release plate, the release member to move a release plate;
a first biasing member to bias the clamp member to a stored position;
a second biasing member to bias the clamp plate to an open position; and
a third biasing member to bias a release plate to a locked position.

3. The apparatus of claim 1, comprising:
the clamp member to move between a first position and a second position, the clamp member to apply the force to the object in the second position;
the release member disposed away from the clamp member, the release member to return the clamp member from the second position to the first position; and
the force member disposed between the clamp member and the release member.

4. The apparatus of claim 1, comprising:
a post to extend out of the apparatus and retract into the apparatus to move the clamp member between a first position and a second position;
a release plate comprising an opening, the post to extend through the opening, the release plate biased to a locked position, the locked position comprising the release plate disposed at an angle relative to the post to maintain the clamp member in the second position; and
the release member to move the release plate to an open position from the locked position to allow the post to retract into the apparatus to return the clamp member to the first position.

5. The apparatus of claim 1, comprising:
a post coupled with the clamp member; and
a release plate comprising an opening to receive the post, the release plate to move between a first plate position and a second plate position, the first plate position angled relative to the post to prevent the clamp member from returning to a stored position to an extended position, the second plate position more perpendicular to the post than the first plate position to allow the post to translate through the opening to return the clamp member to the stored position.

6. The apparatus of claim 1, comprising:
a biasing member to bias the clamp member to a stored position.

7. The apparatus of claim 1, wherein the clamp member is an elongated member, the apparatus comprising:
a first post coupled with a first end of the elongated member;
a second post coupled with a second end of the elongated member, the first post and the second post to extend in and out of the apparatus to move the clamp member between a first position and a second position; and the force member and the release member disposed between the first post and the second post.

8. The apparatus of claim 1, comprising:
a clamp lever coupled with the force member, the force member to move the clamp lever between a first clamp lever position and a second clamp lever position; and
a clamp plate disposed between the clamp lever and the clamp member, the force member to move the clamp lever between an open position and a locked position to increase the force applied to the object via the clamp member.

9. The apparatus of claim 1, comprising:
a post coupled with the clamp member;
a clamp plate comprising a clamp plate opening to receive the post; and
a release plate comprising a release plate opening to receive the post, the clamp plate biased to an open position and the release plate biased to a locked position, the clamp plate to increase the force applied to the object via the clamp member, and the release plate to remove the force applied to the object via the clamp member.

10. A method, comprising:
coupling a clamp member with a post, the post to translate to move the clamp member between a first position and a second position;
providing a release member to control a position of the post, the release member to facilitate movement of the clamp member from the second position to the first position; and
disposing a force member between the clamp member and the release member, the force member to increase the force applied to the object with the clamp member in the second position.

11. The method of claim 10, comprising:
coupling the force member with a clamp lever, the clamp lever to rotate around a first pivot point to move a clamp plate between a first clamp plate position and a second clamp plate position to move the post in a first direction; and
coupling the release member with a release lever, the release lever to rotate around a second pivot point to move a release plate between a first release plate position and a second release plate position to move the post in a second direction.

12. The method of claim 10, comprising:
extending the post through an opening of a release plate;
biasing the release plate at an angle relative to the post; and
preventing the post from retracting the clamp member to the first position based on the angle of the release plate.

13. The method of claim 10, comprising:
biasing the clamp member to a stored position;
biasing a clamp plate to an open position, the clamp plate to move the post in a first direction; and
biasing a release plate to a closed position, the release plate to move the post in a second direction.

14. The method of claim 10, comprising:
coupling a first end of a release lever with the release member;
coupling a second end of the release lever with a release plate, the release plate disposed at an angle relative to the post, translation of the release member to rotate the release lever and flatten the angle of the release plate to allow the post to translate and retract the clamp member from an extended position to a retracted position.

15. A bed box of a vehicle, the bed box comprising:
a side surface;
a bottom surface; and
a clamp mechanism disposed on the side surface, the
clamp mechanism comprising:
a clamp member to move between a first position and
a second position, the clamp member to apply a force
to an object in the second position, the clamp mem-
ber to be disposed beyond the bottom surface in the
second position;
a release member disposed away from the clamp mem-
ber, the release member to return the clamp member
from the second position to the first position; and
a force member disposed between the clamp member
and the release member, the force member to
increase the force applied to the object via the clamp
member.

16. The bed box of claim 15, comprising:
the clamp mechanism, comprising:
a post to extend out of the clamp mechanism and retract
into the clamp mechanism to move the clamp mem-
ber between the first position and the second posi-
tion;
a release plate comprising an opening, the post to
extend through the opening, the release plate disposed at an angle relative to the post to maintain the
clamp member in the second position; and
a release lever extending between the release plate and
the release member, the release lever to move the
release plate to allow the clamp member to return to
the first position.

17. The bed box of claim 15, comprising:
the clamp mechanism, comprising:
a first biasing member to bias the clamp member in a
first direction;
a second biasing member to bias the force member in
the first direction; and
a third biasing member to bias the release member in a
second direction opposite the first direction.

18. The bed box of claim 15, comprising:
the clamp mechanism, comprising:
a post coupled with the clamp member;
a clamp plate comprising a clamp opening to receive
the post; and
a release plate comprising a release opening to receive
the post, the force member to move to increase the
force applied to the object via the clamp member,
and the release plate to move to remove the force
applied to the object via the clamp member.

* * * * *